(12) United States Patent
Katsuta

(10) Patent No.: US 11,868,559 B2
(45) Date of Patent: Jan. 9, 2024

(54) DETECTION FUNCTION-EQUIPPED DISPLAY DEVICE

(71) Applicant: Japan Display Inc., Tokyo (JP)

(72) Inventor: Tadayoshi Katsuta, Tokyo (JP)

(73) Assignee: Japan Display Inc., Tokyo (JP)

( * ) Notice: Subject to any disclaimer, the term of this patent is extended or adjusted under 35 U.S.C. 154(b) by 72 days.

(21) Appl. No.: 17/548,807

(22) Filed: Dec. 13, 2021

(65) Prior Publication Data

US 2022/0100345 A1     Mar. 31, 2022

Related U.S. Application Data

(63) Continuation of application No. PCT/JP2020/016792, filed on Apr. 16, 2020.

(30) Foreign Application Priority Data

Jun. 18, 2019 (JP) .................. 2019-113208

(51) Int. Cl.
*G06F 3/041* (2006.01)
*G06F 3/044* (2006.01)
*G02F 1/1333* (2006.01)

(52) U.S. Cl.
CPC ...... *G06F 3/04166* (2019.05); *G02F 1/13338* (2013.01); *G06F 3/0412* (2013.01); *G06F 3/0446* (2019.05); *G06F 3/04164* (2019.05)

(58) Field of Classification Search
None
See application file for complete search history.

(56) References Cited

U.S. PATENT DOCUMENTS

| 2015/0116247 A1 | 4/2015 | Inoue et al. |
| 2015/0370401 A1 | 12/2015 | Mizuhashi et al. |

(Continued)

FOREIGN PATENT DOCUMENTS

| JP | 2015-111400 A | 6/2015 |
| JP | 2016-004180 A | 1/2016 |

(Continued)

OTHER PUBLICATIONS

Search Report issued in International Patent Application No. PCT/JP2020/016792 dated Jun. 9, 2020 and English translation of same. 5 pages.

(Continued)

*Primary Examiner* — Krishna P Neupane
(74) *Attorney, Agent, or Firm* — K&L Gates LLP

(57) ABSTRACT

A detection function-equipped display device includes: a display unit provided with pixels; drive electrodes disposed along a display surface of the display unit and arranged in a first direction; detection electrodes disposed along the display surface, arranged in a second direction, and facing the drive electrodes; a potential selection circuit that performs switching control; a scanning circuit that outputs a scanning signal; a detection circuit that performs detection of a touch on the display surface based on potentials from the detection electrodes; and a signal selection circuit that supplies, to the potential selection circuit, either a first signal corresponding to the scanning signal or a second signal from the detection circuit. The switching control includes processing of applying the drive potential to one or more of the drive electrodes based on one of the first signal and the second signal and applying the non-drive potential to the other drive electrodes.

20 Claims, 14 Drawing Sheets

(56) References Cited

U.S. PATENT DOCUMENTS

| | | | |
|---|---|---|---|
| 2016/0147339 A1 | 5/2016 | Teranishi et al. | |
| 2016/0202835 A1* | 7/2016 | Mizuhashi | G02F 1/13306 345/174 |
| 2018/0224973 A1 | 8/2018 | Teranishi et al. | |
| 2019/0103069 A1* | 4/2019 | Choi | G06F 3/04166 |
| 2019/0384457 A1 | 12/2019 | Fujiyoshi | |
| 2020/0197822 A1* | 6/2020 | Horii | G06F 1/163 |

FOREIGN PATENT DOCUMENTS

| | | |
|---|---|---|
| JP | 2016-099897 A | 5/2016 |
| WO | WO2018/159460 A1 | 9/2018 |

OTHER PUBLICATIONS

Written Opinion issued in International Patent Application No. PCT/JP2020/016792 dated Jun. 9, 2020. 3 pages.

* cited by examiner

DETECTION FUNCTION-EQUIPPED DISPLAY DEVICE

CROSS-REFERENCE TO RELATED APPLICATION

This application claims the benefit of priority from Japanese Patent Application No. 2019-113208 filed on Jun. 18, 2019 and International Patent Application No. PCT/JP2020/016792 filed on Apr. 16, 2020, the entire contents of which are incorporated herein by reference.

BACKGROUND

1. Technical Field

What is disclosed herein relates to a detection function-equipped display device.

2. Description of the Related Art

Recently, a touch detection device capable of detecting an external proximity object, which is called a touch panel, has attracted attention. The touch panel is mounted or integrated on a display device such as a liquid crystal display device and used as a touch detection function-equipped display device. The touch detection function-equipped display device displays various button images and the like on the display device to use the touch panel as normal mechanical buttons, thereby enabling information input (for example, Japanese Patent Application Laid-open Publication No. 2016-099897).

Examples of the type of a touch panel include an in-cell type assumed for a panel in which a touch panel function and a display function are integrally provided, and an out-cell type assumed for a panel in which the touch panel function and the display function are separated from each other. Conventionally, a circuit configuration related to the touch panel function has been different between the in-cell type and the out-cell type. Thus, there have been an in-cell IC and an out-cell IC as integrated circuits (ICs) that perform touch detection. In other words, the configuration of a touch panel has needed to be designed for an IC that performs touch detection. There has been a demand to relax such limitation on a combination of a touch panel and an IC.

For the foregoing reasons, there is a need for a detection function-equipped display device capable of employing more kinds of ICs.

SUMMARY

According to an aspect, a detection function-equipped display device includes: a display unit in which a plurality of pixels are disposed; a plurality of drive electrodes disposed along a display surface of the display unit and arranged in a first direction; a plurality of detection electrodes disposed along the display surface, arranged in a second direction different from the first direction, and facing the drive electrodes; a potential selection circuit configured to perform switching control to switch a potential to be applied to each drive electrode between a drive potential and a non-drive potential; a scanning circuit configured to output a scanning signal for scanning the drive electrodes; a detection circuit configured to perform detection of a touch on the display surface based on potentials output from the detection electrodes; and a signal selection circuit configured to supply, to the potential selection circuit, either a first signal corresponding to the scanning signal from the scanning circuit or a second signal from the detection circuit. The switching control includes processing of applying the drive potential to one or more of the drive electrodes based on one of the first signal and the second signal and applying the non-drive potential to the other drive electrodes other than the one or more of the drive electrodes.

BRIEF DESCRIPTION OF THE DRAWINGS

FIG. 9 is a schematic time chart illustrating the high-low levels of various signals in a case in which a touch panel IC 18 is the touch panel IC 18a;

DETAILED DESCRIPTION

Modes (embodiments) for carrying out the present disclosure will be described below in detail with reference to the accompanying drawings. The present disclosure is not limited by contents described below in the embodiments. Components described below include those that could be easily thought of by the skilled person in the art and those identical in effect. Components described below may be combined as appropriate. What is disclosed herein is merely exemplary, and the scope of the present disclosure includes any modification that could be easily thought of by the skilled person in the art as appropriate without departing from the scope of the disclosure. For clearer description, the drawings are schematically illustrated for the width, thickness, shape, and the like of each component as compared to actual aspects thereof in some cases, but they are merely exemplary and do not limit interpretation of the present disclosure. In the present specification and the drawings, any element that is the same as that already described with reference to an already described drawing is denoted by the same reference sign, and detailed description thereof is omitted as appropriate.

In this disclosure, when an element is described as being "on" another element, the element can be directly on the other element, or there can be one or more elements between the element and the other element.

Figure 1:
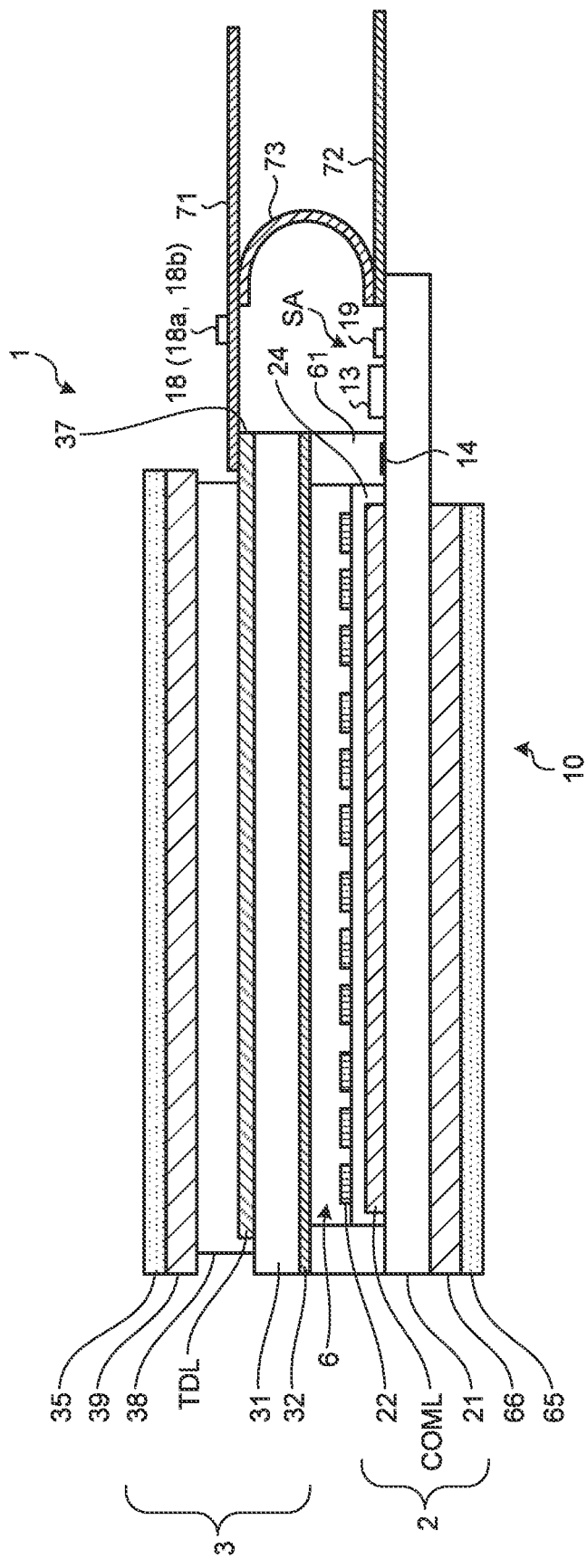
FIG. 1 is a cross-sectional view illustrating a schematic sectional structure of a touch detection function-equipped display device.
Figure 2:
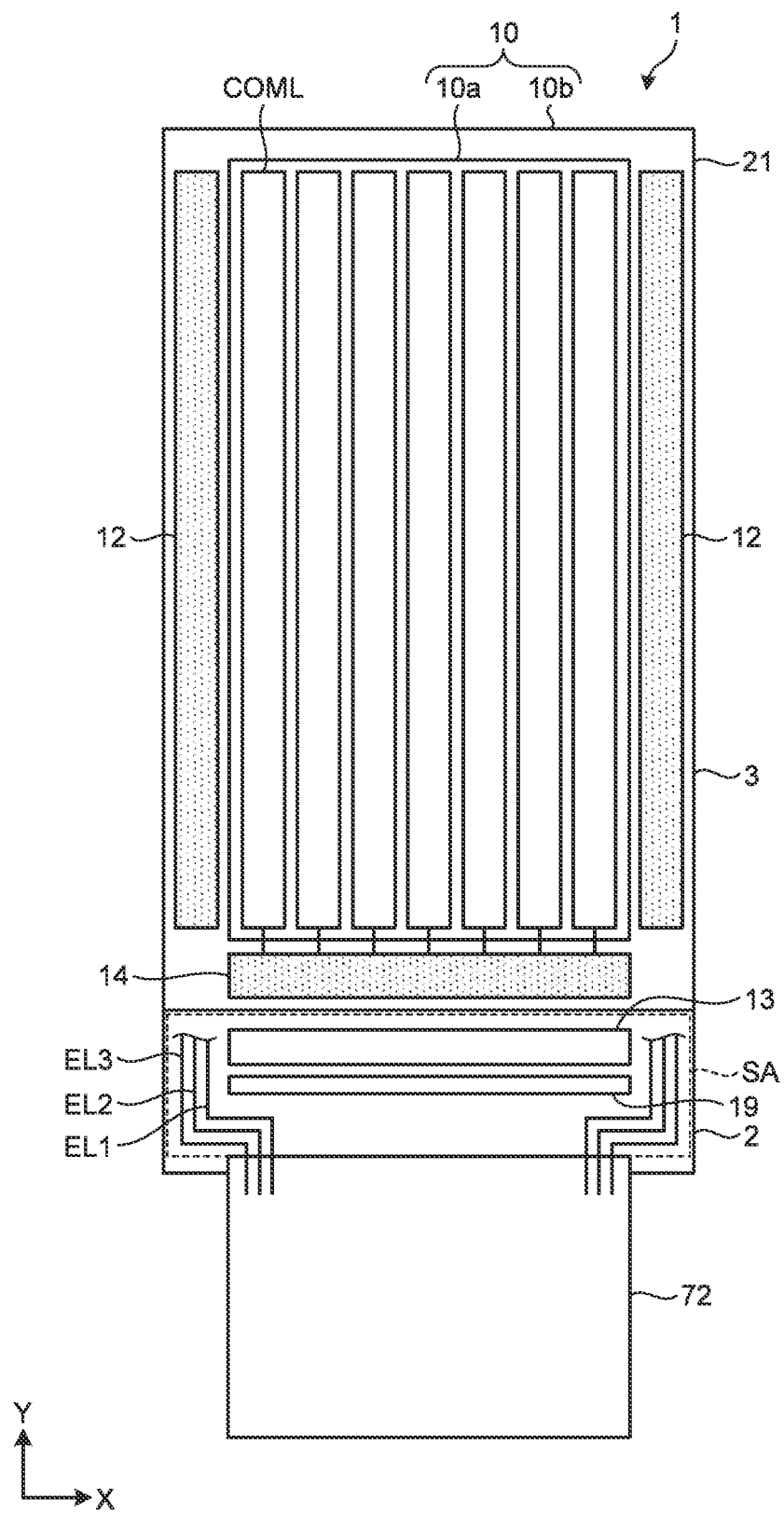
FIG. 2 is a plan view schematically illustrating a TFT substrate included in the touch detection function-equipped display device.
Figure 3:
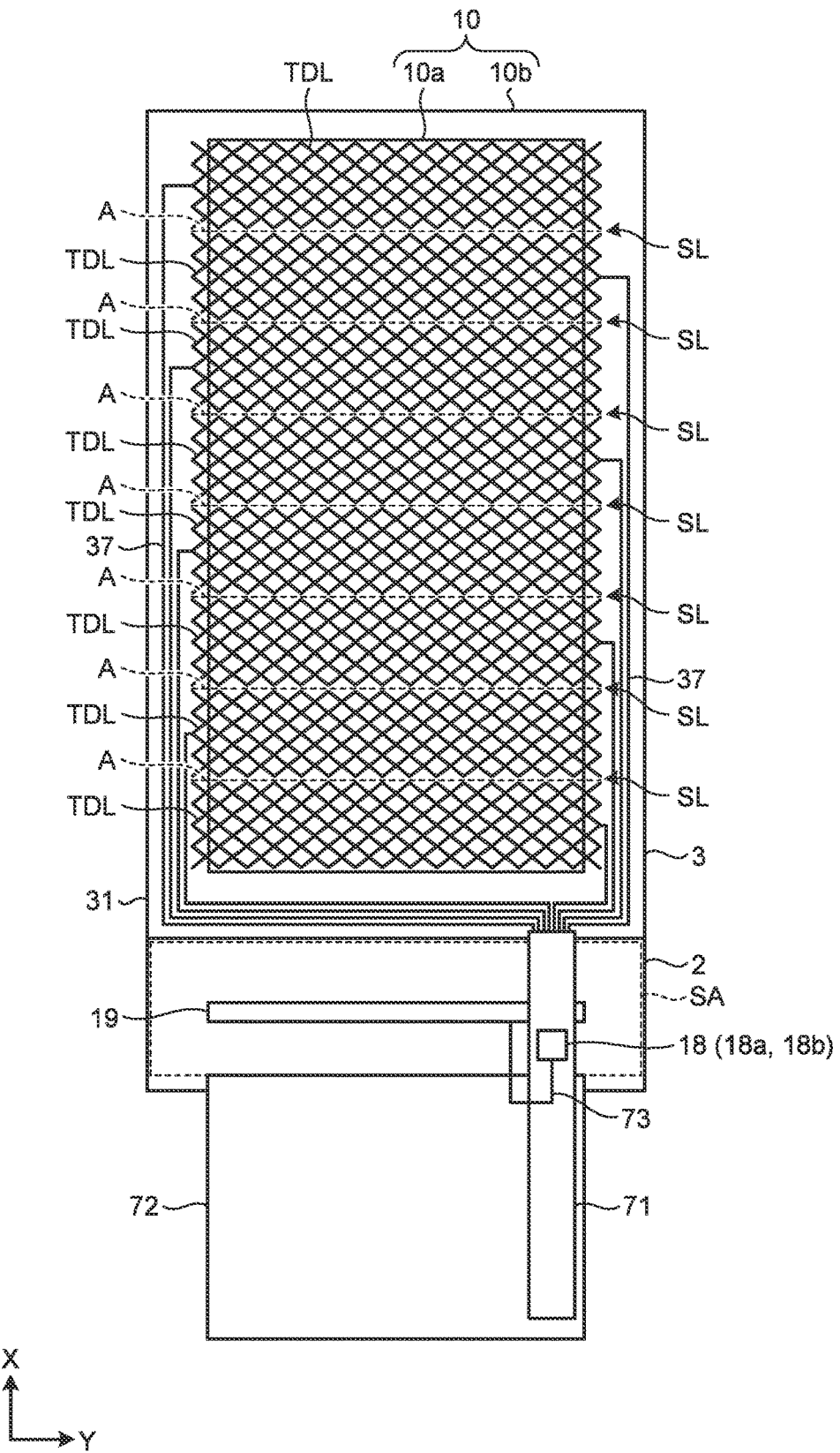
FIG. 3 is a plan view schematically illustrating an insulation substrate included in the touch detection function-equipped display device.

FIG. 1 is a cross-sectional view illustrating a schematic sectional structure of a touch detection function-equipped display device according to an embodiment. FIG. 2 is a plan view schematically illustrating a TFT substrate included in a display device. FIG. 3 is a plan view schematically illustrating an insulation substrate included in the display device. As illustrated in FIG. 1, the touch detection function-equipped display device includes a touch detection function-equipped display unit 10 and a touch panel integrated circuit (IC). As described later, either an in-cell touch panel IC 18a or an out-cell touch panel IC 18b may be employed as the touch panel IC. The touch detection function-equipped display unit 10 includes a display panel 20 and a display driver integrated circuit (DDIC) 19 mounted on the display panel 20. The display panel 20 includes an array substrate 2, a counter substrate 3 disposed to face the array substrate 2 in a direction orthogonal to the surface of the array substrate 2, and a liquid crystal layer 6 inserted between the array substrate 2 and the counter substrate 3. The DDIC 19 functions as a controller of the display panel 20.

As illustrated in FIG. 1, the array substrate 2 includes a TFT substrate 21 provided with a plurality of thin film transistors (TFTs) as switching elements on an insulating substrate, a plurality of pixel electrodes 22 disposed in a matrix above the TFT substrate 21, a plurality of drive electrodes COML provided between the TFT substrate 21 and the pixel electrodes 22, and an insulating layer 24 that insulates the pixel electrodes 22 from the drive electrodes COML. A polarization plate 65 may be provided on the lower side of the TFT substrate 21 with a bonding layer 66 interposed therebetween.

As illustrated in FIG. 2, the touch detection function-equipped display unit 10 includes a display region 10a in which an image is displayed, and a frame region 10b outside the display region 10a. The display region 10a has a rectangular shape with a pair of long sides and a pair of short sides. The frame region 10b has a frame shape surrounding the four sides of the display region 10a. The display region 10a and the frame region 10b each may employ a configuration in a shape other than such a rectangular shape and, for example, may employ a configuration in a polygonal shape other than a rectangular shape or in a shape partially or entirely having a curved perimeter, such as a circular shape or an elliptical shape. For example, a configuration in a rectangular shape having corner parts in protruding circular arc shapes, or a configuration in a rectangular shape partially recessed inward may be employed.

The TFT substrate 21 includes a pair of gate drivers 12, a source driver 13, and a drive circuit unit 14 in a non-display region. The display panel 20 is an element configured to perform display by sequential scanning of each horizontal line in accordance with a scanning signal Vscan supplied from the gate drivers 12. The DDIC 19 is a circuit configured to supply a control signal to each of the gate drivers 12, the source driver 13, the drive circuit unit 14, and a touch detector 30 based on an image signal supplied from the outside and control these components to operate them in synchronization with one another.

The pair of gate drivers 12 has a function to sequentially select each horizontal line as a display drive target of the touch detection function-equipped display unit 10 based on the control signal supplied from the DDIC 19.

The source driver 13 is a circuit configured to supply a pixel signal Vpix to each sub pixel SPix (to be described later) of the touch detection function-equipped display unit 10 based on a control signal supplied from the DDIC 19. In the present embodiment, the source driver 13 is provided between the drive circuit unit 14 and the DDIC 19, but it is possible to employ a configuration in which the source driver 13 is partially or entirely formed in the DDIC 19.

The drive circuit unit 14 is a circuit configured to supply a drive signal Vcom to each drive electrode COML (to be described later) of the touch detection function-equipped display unit 10 based on a control signal supplied from the DDIC 19.

The TFT substrate 21 is formed partially larger than the counter substrate 3 and includes an extension part SA that does not overlap with the counter substrate 3. The DDIC 19 is provided in the extension part SA. A flexible substrate 72 is coupled to an end part of the extension part SA. The DDIC 19 outputs control signals to, for example, gate lines GCL and source lines SGL, which will be described later, based on an image signal supplied from an external host IC (not illustrated). It is possible to employ a configuration in which the DDIC 19 is mounted on not the extension part SA but the flexible substrate 72. The display panel 20 receives power supply from an external power circuit (not illustrated). In the present embodiment, a first potential line EL1, a second potential line EL2, and a third potential line EL3 are provided as wiring for the power supply. In addition, for example, wiring for power supply to the DDIC 19 is provided (not illustrated).

The touch detection function-equipped display unit 10 is a device in which a touch detection function (the touch detector 30) as a touch detection device configured to detect touch input is built in the display panel 20 including a liquid crystal display element as a display element. A touch detection function-equipped display device of such a kind is referred to as an in-cell type. A touch detection function-equipped display device having a configuration in which a touch panel is mounted on the display panel 20 is referred to as an on-cell type. The display panel 20 may be, for example, an organic EL display panel, a micro LED display device, or an electrophoretic display panel.

A plurality of the drive electrodes COML are provided in the display region 10a of the TFT substrate 21 and extend in a direction (Y direction) along the long sides of the display region 10a. The plurality of drive electrodes COML are arrayed in a direction (X direction) along the short sides of the display region 10a. The drive electrodes COML are made of, for example, a translucent conductive material such as indium tin oxide (ITO).

As exemplarily illustrated in FIGS. 2 and 3, the gate drivers 12 are disposed near the long sides of the frame region 10b of the TFT substrate 21. The source driver 13 and the DDIC 19 are disposed, for example, in the extension part SA of the frame region 10b of the TFT substrate 21. The drive circuit unit 14 is disposed near one end part in the direction in which the drive electrodes COML extend. More preferably, the drive circuit unit 14 is provided between the display region 10*a* and the DDIC 19.

As illustrated in FIG. 1, the counter substrate 3 includes an insulation substrate 31 and a color filter 32 formed on one surface of the insulation substrate 31. A plurality of touch detection electrodes TDL (hereinafter also simply referred to as detection electrodes TDL) are provided on the other surface of the insulation substrate 31 as detection electrodes of the touch detector 30. A protective layer 38 is provided on the detection electrodes TDL. A polarization plate 35 is provided above the detection electrodes TDL with a bonding layer 39 interposed therebetween. A flexible substrate 71 is coupled to the insulation substrate 31. A touch panel IC 18 is provided on the flexible substrate 71 and coupled to the detection electrodes TDL through frame lines 37.

As illustrated in FIG. 3, the detection electrodes TDL are provided in the display region, extended in the direction (X direction) along the short sides of the display region 10*a*, and arrayed in the direction (Y direction) along the long sides of the display region 10*a*. Each detection electrode TDL is formed of metal lines in a mesh shape. The detection electrodes TDL are separated by slits SL provided at places illustrated with dotted lines A in FIG. 3. It is possible to employ a configuration in which dummy electrode parts are provided between and inside the detection electrodes TDL. Each dummy electrode part is not coupled to any signal line and constantly electrically indefinite irrespective of the state of the display panel 20.

As illustrated in FIG. 3, the frame lines 37 extended from the detection electrodes TDL are provided in the frame region 10*b* of the insulation substrate 31. The frame lines 37 are extended along the long sides of the frame region 10*b* and coupled to the flexible substrate 71. The touch panel IC 18 is mounted on the flexible substrate 71. The touch panel IC 18 includes the touch detector 30 illustrated in FIG. 5 to be described later, and output signals from the detection electrodes TDL are supplied to the touch panel IC 18 through the frame lines 37 and the flexible substrate 71. A flexible substrate 73 is provided to couple the flexible substrate 71 and the flexible substrate 72, and the touch panel IC 18 is coupled to the DDIC 19 through the flexible substrates 71, 72, and 73.

As illustrated in FIG. 1, the array substrate 2 and the counter substrate 3 are disposed to face each other with a predetermined gap therebetween and with a seal 61 interposed therebetween. The liquid crystal layer 6 is provided in a space between the array substrate 2 and the counter substrate 3. The liquid crystal layer 6 modulates light passing through an electric field in accordance with the state of the electric field, and is made of liquid crystal of a lateral electric field mode such as in-plane switching (IPS) including fringe field switching (FFS).

Figure 4:
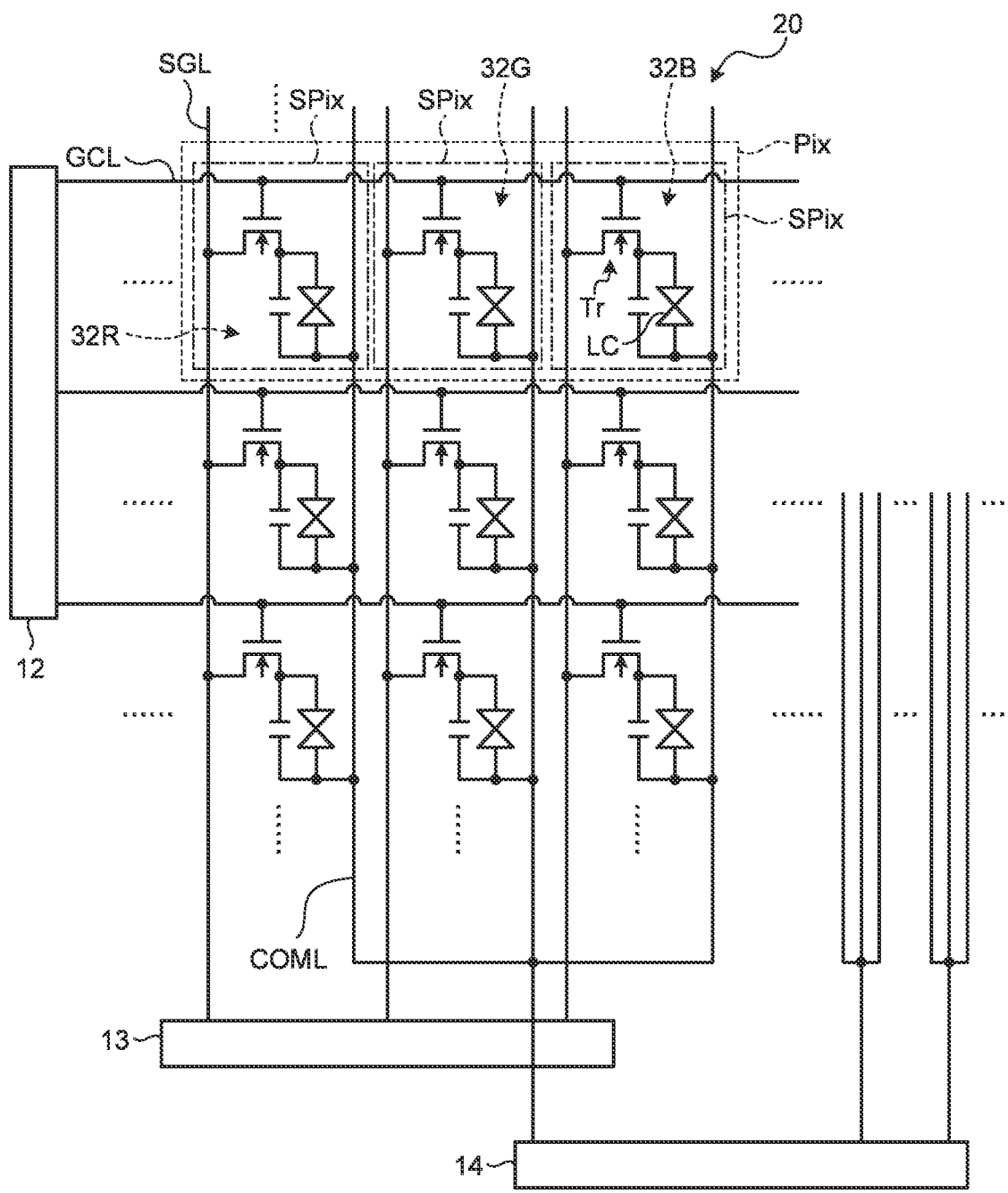
FIG. 4 is a circuit diagram illustrating a pixel array of a touch detection function-equipped display unit according to an embodiment.

The following describes display operation of the display panel 20. FIG. 4 is a circuit diagram illustrating a pixel array of the touch detection function-equipped display unit according to the embodiment. A thin film transistor element (hereinafter referred to as a TFT element) Tr of each sub pixel SPix illustrated in FIG. 4 and wiring lines such as source lines SGL through which the pixel signals Vpix are supplied to the pixel electrodes 22 and gate lines GCL through which drive signals for driving the TFT elements Tr are supplied, are formed on the TFT substrate 21.

The display panel 20 illustrated in FIG. 4 includes a plurality of the sub pixels SPix arrayed in a matrix (row-column configuration). Each sub pixel SPix includes the TFT element Tr and a liquid crystal element LC. The TFT element Tr is formed with a thin film transistor. The TFT element Tr is formed with an n-channel metal oxide semiconductor (MOS) TFT in this example. The liquid crystal element LC is formed by the pixel electrode 22 coupled to the drain of the TFT element Tr, a drive electrode COML provided to face the pixel electrode 22, and the liquid crystal layer 6 having an orientation state that is changed by an electric field generated between the pixel electrode 22 and the drive electrode COML.

The TFT element Tr of each sub pixel SPix is coupled, through the gate line GCL, to the TFT element Tr of any other sub pixel SPix belonging to the same row. The gate line GCL is coupled to the gate driver 12 and supplied with the scanning signal Vscan from the gate driver 12. The TFT element Tr of each sub pixel SPix is coupled, through the source line SGL, to the TFT element Tr of any other sub pixel SPix belonging to the same column. The source line SGL is coupled to the source driver 13 and supplied with the pixel signal Vpix from the source driver 13. The sub pixels SPix of a plurality of columns adjacent to each other share one drive electrode COML. Although sub pixels SPix of three columns share one drive electrode COML in FIG. 4 for convenience of illustration, 2 to 200 pixel columns approximately share one drive electrodes COML. Each drive electrode COML is coupled to the drive circuit unit 14. The gate driver 12, the source driver 13, and the drive circuit unit 14 in FIG. 4 are merely schematic illustrations for indicating coupling relations with components of the display panel 20 but not for indicating physical characteristics such as arrangement relations, shapes, and sizes.

Display drive in the display panel 20 will be described below. The gate drivers 12 are driven to sequentially scan the gate lines GCL. The gate drivers 12 supply the scanning signal Vscan to the gates of the TFT elements Tr of sub pixels SPix through each gate line GCL. Thus, the sub pixels SPix belonging to one row (one horizontal line) are sequentially selected as display drive targets. In this case, the source driver 13 supplies the pixel signals Vpix to the sub pixels SPix belonging to the one horizontal line through the source lines SGL. The display panel 20 repeats such drive to perform display of each horizontal line. When this display operation is performed, the drive circuit unit 14 applies a display drive signal Vcomd to all of the drive electrodes COML. In the present embodiment, a direct-current drive signal VcomDC is employed as the display drive signal. The present disclosure is not limited thereto, and an alternating-current signal may be employed as the drive signal.

The color filter 32 illustrated in FIG. 1 may be configured such that color regions of color filters colored in, for example, three colors of red (R), green (G), and blue (B) are periodically arrayed. The color regions 32R, 32G, and 32B in the three colors of R, G, and B, as a set, are associated with the sub pixels SPix illustrated in FIG. 4 described above, and the sub pixels SPix corresponding to the color regions 32R, 32G, and 32B in the three colors constitutes a pixel Pix. As illustrated in FIG. 1, the color filter 32 faces the liquid crystal layer 6 in a direction orthogonal to the TFT substrate 21. The color filter 32 may be colored in any other combination of colors different from one another. The color combination of the color filter 32 is not limited to a combination of three colors but may be a combination of four or more colors.

Figure 5:
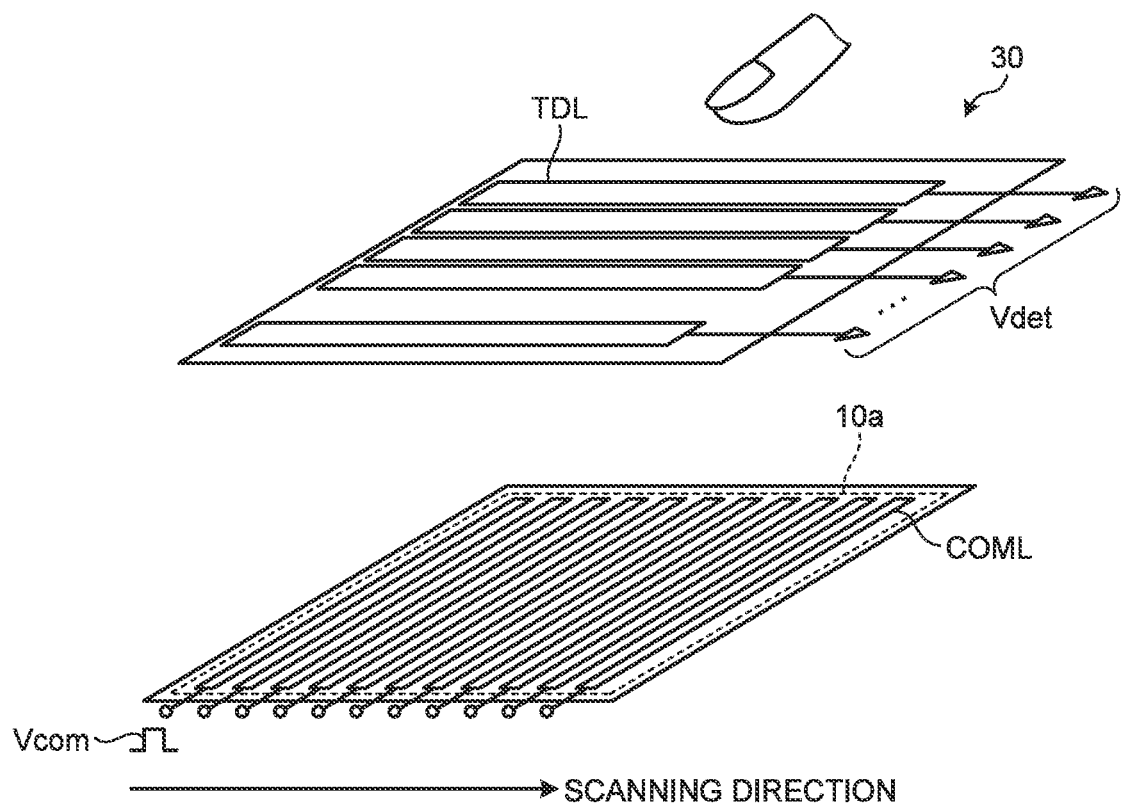
FIG. 5 is a perspective view illustrating an exemplary configuration of drive electrodes and touch detection electrodes of the touch detection function-equipped display unit according to the embodiment.

The plurality of drive electrodes COML illustrated in FIGS. 1 and 2 function as common electrodes for all of the sub pixels SPix when the touch detection function-equipped display unit 10 functions as the display panel 20. The drive electrodes COML also function as drive electrodes for performing touch detection when the touch detection function-equipped display unit 10 functions as the touch detector 30. FIG. 5 is a perspective view illustrating an exemplary configuration of the drive electrodes and the detection electrodes TDL of the touch detection function-equipped display unit according to the embodiment. The touch detector 30 includes the drive electrodes COML provided in the array substrate 2 and the detection electrodes TDL provided in the counter substrate 3.

Each drive electrode COML extends in the front-back direction of FIG. 5. Each detection electrode TDL extends in a direction intersecting the drive electrodes COML. The detection electrodes TDL face the drive electrodes COML in a direction orthogonal to the surface of the TFT substrate 21. In this manner, when the detection electrodes TDL and the drive electrodes COML are provided to intersect each other, capacitive touch sensors are disposed in a matrix (row-column configuration) in the display region 10a. Each detection electrode TDL is coupled to the touch panel IC 18.

When the touch detection function-equipped display unit 10 functions as the touch detector 30, a drive signal Vcomt for touch drive is sequentially supplied to each drive electrode COML as illustrated in FIG. 5. Thus, capacitance is generated between the drive electrode COML supplied with the drive signal Vcomt and each detection electrode TDL. Then, an electric signal based on the capacitance is output from the detection electrode TDL. The magnitude of the above-described capacitance changes as a conductor such as a human finger approaches, whereby the output electric signal changes as well. Specifically, the electric signal having the change is output to the touch panel IC 18 as a touch detection signal Vdet. A scheme for detecting a touch based on change of the capacitance between each drive electrode COML and each detection electrode TDL in this manner is referred to as a mutual capacitive scheme (mutual scheme).

In the touch detector 30 of the present embodiment, mutual detection is performed for each drive electrode COML as the touch detection signal Vdet is output based on change of the capacitance between each drive electrode COML and each detection electrode TDL. The drive signal Vcomt for the touch detection signal is preferably one pulsed wave or a plurality of pulsed waves.

The touch detector 30 of the present embodiment can perform touch detection by a scheme different from the mutual capacitive scheme, more specifically, can perform touch detection by a self-capacitive scheme (self-scheme). In the self-capacitive scheme in the present embodiment, capacitance is generated between a finger and each drive electrode COML by simultaneously supplying a drive signal Tx_self for self-touch detection to one, some, or all of the drive electrodes COML. Then, the magnitude of the drive signal supplied to the one, some, or all of the drive electrode COML changes as the capacitance changes, and this change is detected by the touch panel IC 18 as a touch. In this configuration, the drive signal (hereinafter also referred to as a self-signal) Tx_self for self-touch detection is directly supplied from the touch panel IC 18 to each drive electrode COML.

Figure 6:
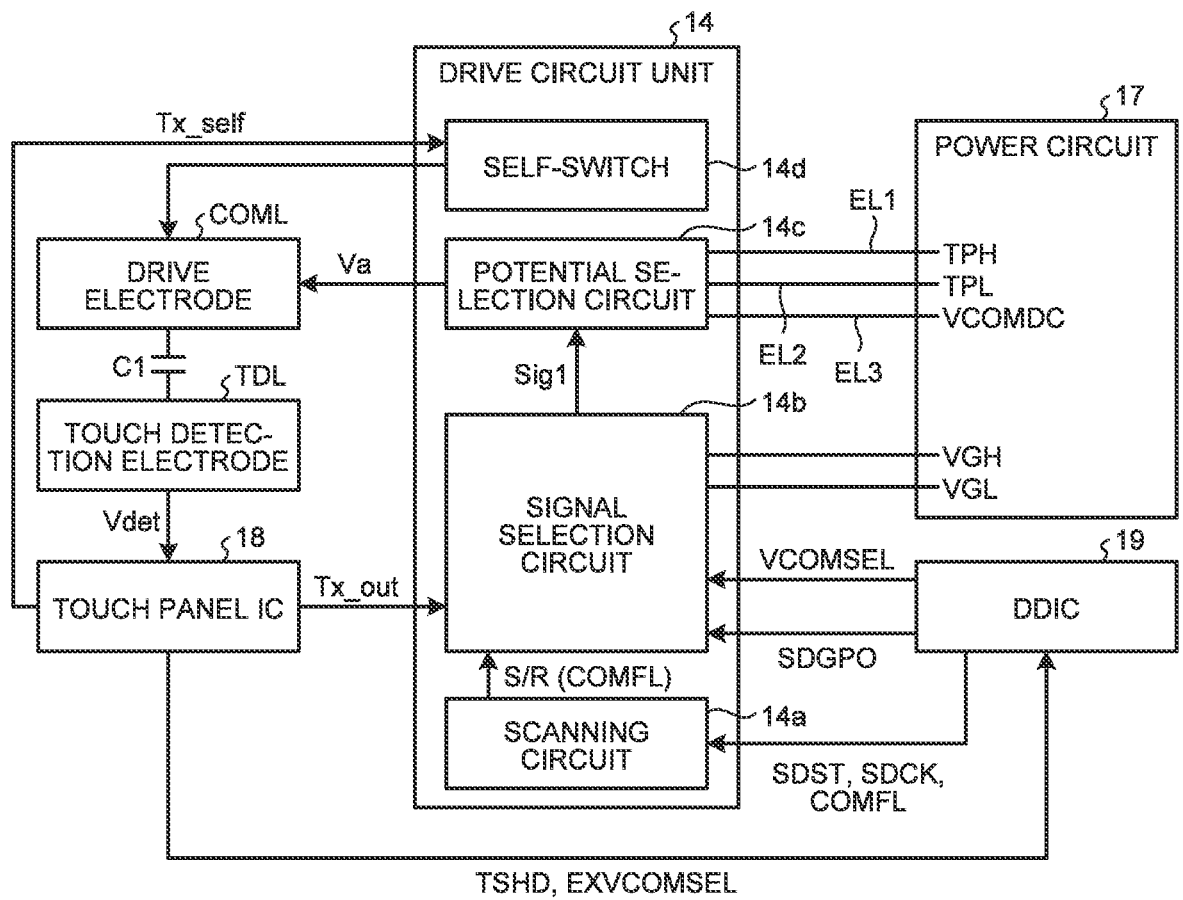
FIG. 6 is a block diagram illustrating a main exemplary configuration of a drive circuit unit and exemplary configurations of various components coupled to the drive circuit unit.

FIG. 6 is a block diagram illustrating the drive circuit unit 14 and other circuits and components coupled to the drive circuit unit 14. The drive circuit unit 14 includes a scanning circuit 14a, a signal selection circuit 14b, a potential selection circuit 14c, and a self-switch 14d.

The scanning circuit 14a scans the drive electrodes COML in a predetermined cycle. In other words, the scanning circuit 14a performs processing for outputting a shift register signal S/R. Specifically, the scanning circuit 14a is, for example, a circuit including a shift register and outputs the shift register signal (scanning signal) S/R to the signal selection circuit 14b. The scanning signal S/R may be another signal selected by a shift register circuit or may be a signal from the shift register circuit. The signal selection circuit 14b uses the scanning signal S/R and determines a transmission target of a first signal VCOMSEL for the potential selection circuit 14c.

The signal selection circuit 14b performs processing for outputting, to the potential selection circuit 14c, a potential selection signal for determining the state of coupling between the potential selection circuit 14c and each drive electrode COML. Specifically, the signal selection circuit 14b is coupled to the scanning circuit 14a, the DDIC 19, and the touch panel IC 18. The signal selection circuit 14b can receive the first signal VCOMSEL from the DDIC 19 and a second signal Tx_out from the touch panel IC 18, but selects one of the signals in accordance with the high-low level of a type signal SDGPO from the DDIC 19 and decouples the other signal. The signal selection circuit 14b generates the potential selection signal based on signals input from the above-described plurality of circuits and outputs the potential selection signal to the potential selection circuit 14c.

The potential selection circuit 14c controls the potential of each drive electrode COML in accordance with the output from the signal selection circuit 14b. Specifically, the potential selection circuit 14c receives supply of a high drive potential TPH, a low drive potential TPL, and a non-drive potential VcomDC from a power circuit 17 and supplies one of the potentials to each drive electrode COML based on the above-described potential selection signal.

The low drive potential TPL is set as a reference, the high drive potential TPH is higher than the low drive potential TPL, and the non-drive potential VCOMDC is lower than the low drive potential TPL. More specifically, the low drive potential TPL is set to 0 V, the high drive potential TPH is set to be positive, and the non-drive potential VCOMDC is set to be negative. It is possible to employ a configuration in which the non-drive potential VCOMDC is set as a reference, the high drive potential TPH is higher than the non-drive potential VCOMDC, and the low drive potential TPL is lower than the non-drive potential VCOMDC. The power circuit 17 generates voltages corresponding to various kinds of potentials such as the high drive potential TPH, the low drive potential TPL, the non-drive potential VCOMDC, the high potential VGH, and the low potential VGL based on electric power supplied from a non-illustrated power source unit.

The self-switch 14d is a component related to self-detection. Specifically, the self-switch 14d directly couples each drive electrode COML to the touch panel IC 18 at a timing when self-detection is performed, and drives the drive electrode COML based on an output from the touch panel IC 18.

A touch detection function-equipped display device 1 of the present embodiment has a configuration in which one of the in-cell touch panel IC 18a and the out-cell touch panel IC 18b is mounted on the touch detection function-equipped display unit 10. The touch panel IC 18a is mounted in an example illustrated in FIG. 7. The touch panel IC 18b is mounted in an example illustrated in FIG. 8. With any of the touch panel ICs 18a and 18b, it is possible to perform the mutual capacitive touch detection and the self-capacitive touch detection. The touch panel ICs 18a and 18b are referred to as the touch panel IC 18 when collectively described.

As described below in detail, in a case in which the touch panel IC 18a is mounted, the mutual capacitive touch detection is executed based on the first signal VCOMSEL output from the DDIC 19, and the self-capacitive touch detection is executed by using the self-touch-detection drive signal Tx_self output from the touch panel IC 18a. In a case in which the touch panel IC 18b is mounted, the mutual capacitive touch detection is executed based on the second signal Tx_out output from the touch panel IC 18b, and the self-capacitive touch detection is executed by using the self-touch-detection drive signal Tx_self output from the touch panel IC 18b. In the self-capacitive touch detection, drive on the touch panel side is the same in effect in a case in which the touch panel IC 18a is employed and a case in which the touch panel IC 18b is employed.

Hereinafter, the mutual capacitive touch detection based on the first signal VCOMSEL is referred to as first mutual detection, and the mutual capacitive touch detection based on the second signal Tx_out is referred to as second mutual detection. In addition, the self-capacitive touch detection based on the drive signal Tx_self is referred to as self-detection.

Figure 7:
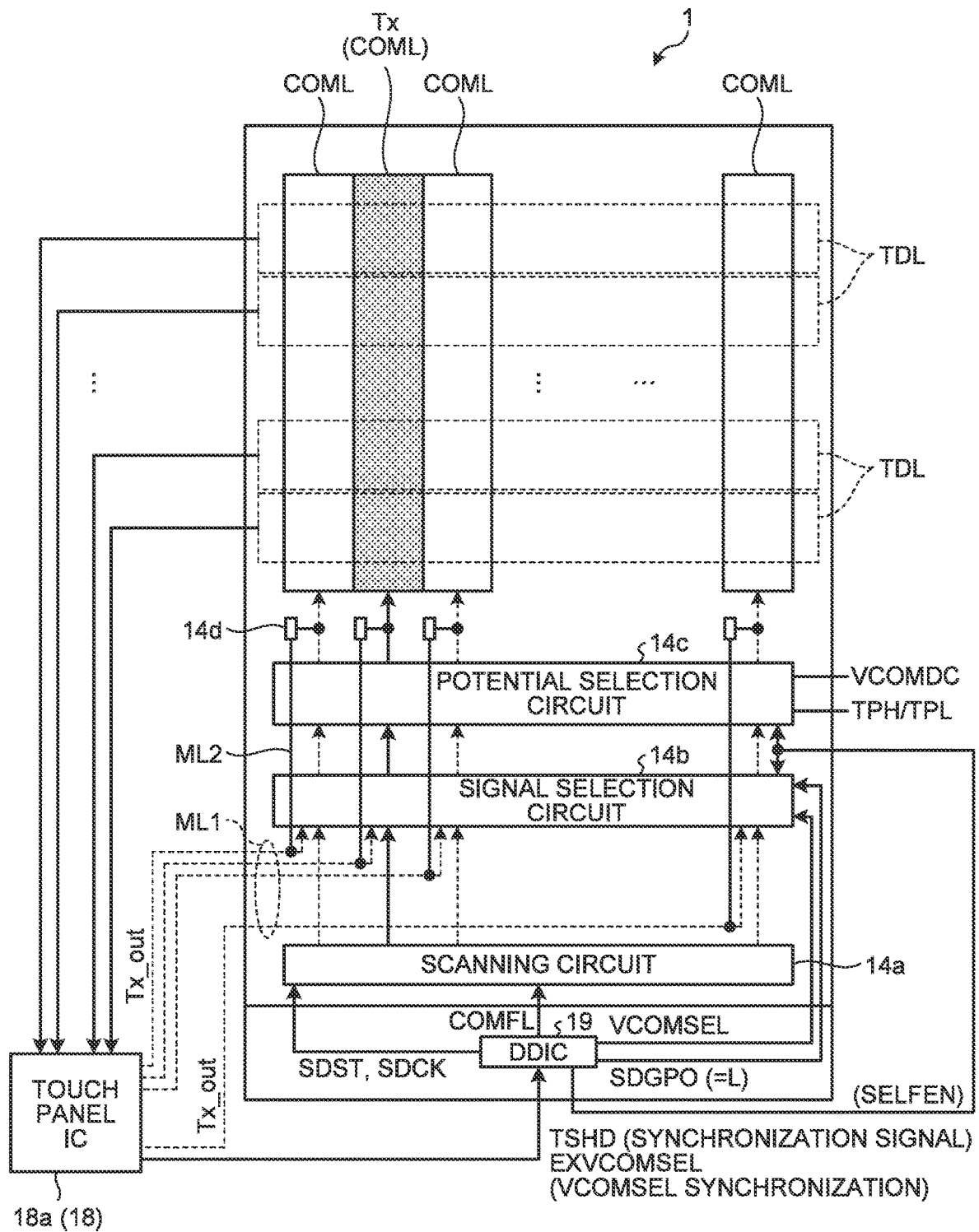
FIG. 7 is a schematic diagram illustrating a touch detection mechanism in a case in which a touch panel IC 18a is employed.

The touch panel IC 18a is a circuit that cannot output the second signal Tx_out or a circuit that can output the second signal Tx_out only to such an extent that the high-low level of the signal cannot necessarily be identified sufficiently. The touch panel IC 18a is also a circuit that can receive, as a touch detection signal through the detection electrodes TDL, a drive signal supplied to each drive electrode COML sequentially selected by the drive circuit unit 14. In other words, the touch panel IC 18a is an IC that can receive a touch detection signal based on a drive signal formed by the drive circuit unit 14 or receive a touch detection signal based on a drive signal asynchronous with the second signal Tx_out. Such a touch panel IC 18a is employed as a touch panel IC of what is called an in-cell type in which components mainly provided for touch detection are incorporated in the touch detection function-equipped display unit 10. In the in-cell type, the drive electrodes COML as a touch panel can be driven by using the configuration of the display panel 20. Thus, a touch panel IC of the in-cell type does not need to include a component configured to drive the drive electrodes COML in the mutual capacitive touch detection. When the touch panel IC 18a is employed, the signal selection circuit 14b selects, as the one signal, the first signal VCOMSEL generated in the DDIC 19 in the mutual capacitive touch detection as schematically illustrated in in FIG. 7. In FIG. 7, one drive electrode COML as a touch detection drive target is denoted by the reference sign Tx.

Figure 8:
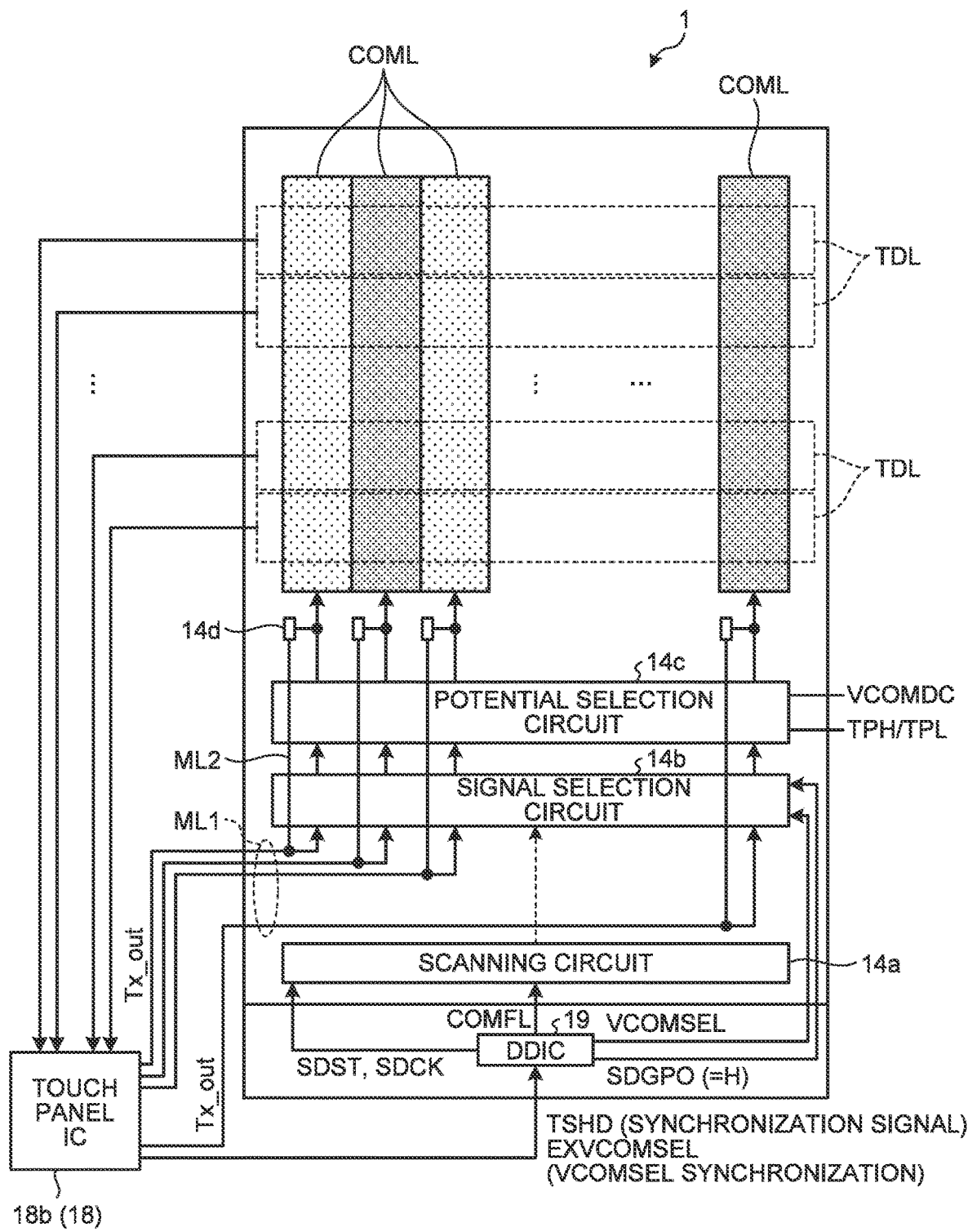
FIG. 8 is a schematic diagram illustrating a touch detection mechanism in a case in which a touch panel IC 18b is employed.

The touch panel IC 18b is employed as a touch panel IC of what is called an out-cell type (external type). Typically, in a touch panel of the out-cell type, the drive electrodes COML and the detection electrodes TDL are provided on a substrate other than that in the display device and directly coupled to a touch panel IC, and a touch detection function is provided when the touch panel IC is driven. Such an out-cell touch panel IC supplies a drive signal to the drive electrodes COML that is used only for touch detection, and the intensity of the signal is relatively low. When a touch panel IC of such a kind is employed in the touch detection function-equipped display unit 10 of the in-cell type as illustrated in FIG. 8, capacitance on the drive electrode COML side (display unit side) for a drive signal from the touch panel IC is large, and a sufficient drive signal cannot be supplied to the drive electrodes COML. The touch panel IC 18b is used for a simple component such as a touch panel of the out-cell type as described above, and thus can receive only a detection signal obtained by driving each drive electrode COML in accordance with a drive signal output from the touch panel IC 18b.

In the touch detection function-equipped display unit 10 of the present embodiment, even when the touch panel IC 18b of such an out-cell type is mounted, touch detection can be performed in the same manner as in a case in which the touch panel IC 18a of the in-cell type is employed. When the touch panel IC 18b is employed, the signal selection circuit 14b selects, as the one signal, the second signal Tx_out output from the touch panel IC 18 in the mutual capacitive touch detection as schematically illustrated in FIG. 8.

With any touch panel IC 18 (18a or 18b) described above, the touch detection function-equipped display unit 10 of the present embodiment can perform the mutual capacitive touch detection using the drive electrodes COML provided in the touch detection function-equipped display unit 10. Moreover, with any touch panel IC 18 described above, the touch detection function-equipped display unit 10 of the present embodiment can perform the self-capacitive touch detection based on a drive signal from the touch panel. This self-touch detection detects only the existence of a touch in the display region 10a (does not detect coordinates thereof) and can perform sufficient detection even when the signal intensity is relatively low.

The configuration of the drive circuit unit 14 of the touch detection function-equipped display unit 10 will be described below in detail with reference to drawings, and thereafter, specific drive when the touch panel ICs 18a or 18b is employed will be described in detail.

As illustrated in FIG. 7, the touch detection function-equipped display unit 10 of the present embodiment includes the drive circuit unit 14 and the DDIC 19 on the extension part SA of the TFT substrate 21. The drive circuit unit 14 is provided between the drive electrodes COML of the display region 10a and the DDIC 19 in the Y direction.

The DDIC 19 receives a synchronization signal TSHD from the touch panel IC 18a or 18b. The synchronization signal TSHD is a signal for synchronizing the touch panel IC 18 and the DDIC 19 with each other. The DDIC 19 also receives a signal EXVCOMSEL from the touch panel IC 18a or 18b. The signal EXVCOMSEL is a signal for outputting the first signal VCOMSEL from the DDIC 19. The first signal VCOMSEL is a source signal for performing the first mutual detection at each drive electrode COML and is output to the signal selection circuit 14b. In a certain touch detection (self-detection), the DDIC 19 outputs a signal SELFEN to the signal selection circuit 14b and the potential selection circuit 14c. The signal SELFEN is a signal used in the certain touch detection.

In addition, the DDIC 19 inputs a start signal SDST and a clock signal SDCK to the scanning circuit 14a. The start signal SDST is a signal indicating the start timing of touch detection (including the first mutual detection, the second mutual detection, and the self-detection to be described later). The clock signal SDCK is a clock signal for controlling the operation timing of the drive circuit unit 14 and each component coupled to the drive circuit unit 14 in a touch detection period.

The DDIC 19 also inputs a signal COMFL to the scanning circuit 14a. The signal COMFL is a signal used in the first mutual detection.

In addition, the DDIC 19 supplies the type signal SDGPO to the signal selection circuit 14b. The type signal SDGPO is switched between a high level and a low level in accordance with the kind (the touch panel IC 18*a* or the touch panel IC 18*b*) of the touch panel IC 18. The DDIC 19 that outputs the type signal SDGPO functions as a control circuit configured to control the operation of the signal selection circuit 14*b*.

The DDIC 19 switches the high-low level of the type signal SDGPO in the first mutual detection in accordance with the kind (the touch panel IC 18*a* or the touch panel IC 18*b*) of the touch panel IC 18. In the embodiment, the DDIC 19 determines the type signal SDGPO to be at the low level when the touch panel IC 18*a* is employed, and determines the type signal SDGPO to be at the high level when the touch panel IC 18*b* is employed. This determination of the type signal SDGPO may be selectable based on a type signal supplied from each touch panel IC (the touch panel IC 18*a* or the touch panel IC 18*b*) to the DDIC 19. Alternatively, since the touch panel IC 18 to be employed is determined in advance, the corresponding type signal may be generated and output by another means in the DDIC 19.

The scanning circuit 14*a* of the drive circuit unit 14 has a shift register function and sequentially outputs the signal COMFL to the signal selection circuit 14*b* based on the shift register function.

The signal selection circuit 14*b* of the drive circuit unit 14 sets the first signal VCOMSEL to be a source signal of the drive signal in the first mutual detection when the type signal SDGPO from the DDIC 19 is at the low level, in other words, when the touch panel IC 18*a* is employed. The signal selection circuit 14*b* sets the second signal Tx_out to be a source signal of the drive signal in the second mutual detection when the type signal SDGPO from the DDIC 19 is at the high level, in other words, when the touch panel IC 18*b* is employed.

The signal selection circuit 14*b* is directly coupled to the touch panel IC 18 through bypass lines ML1. More specifically, the bypass lines ML1 coupling the signal selection circuit 14*b* and the touch panel IC 18 irrespective of the kind of the touch panel IC 18 are provided therebetween. The bypass lines ML1 are provided across the flexible substrates 71 and 72 and couple the signal selection circuit 14*b* and the touch panel IC 18 without interposing the DDIC 19 or other components therebetween. In this manner, a detection circuit (the touch panel IC 18) and the signal selection circuit 14*b* are directly coupled to each other through the bypass lines ML1 but not through the scanning circuit 14*a*.

The signal selection circuit 14*b* generates a potential selection signal Sig based on an input signal that is the first signal or the second signal as described above, and outputs the potential selection signal Sig to the potential selection circuit 14*c*. The potential selection circuit 14*c* is supplied with the high drive potential TPH, the low drive potential TPL, and the non-drive potential VCOMDC from the power circuit 17, and supplies any of the potentials to each drive electrode COML based on the potential selection signal from the signal selection circuit 14*b*.

In addition, a branch line ML2 is provided at a halfway part of each bypass line ML1 and coupled to the self-switch 14*d*. The self-switch 14*d* is provided between the corresponding drive electrode COML and the potential selection circuit 14*c* and has an output line coupled to an output line of the potential selection circuit 14*c*. The output line of the potential selection circuit 14*c* is coupled to the drive electrode COML. In this manner, the drive electrode COML and the detection circuit (the touch panel IC 18) are coupled to each other through the branch line ML2 but not through the signal selection circuit 14*b* nor the potential selection circuit 14*c*. The branch line ML2 has one end coupled to the bypass line ML1 and the other end coupled to a switch (the self-switch 14*d*) configured to control the state of coupling between the detection circuit and the drive electrode COML.

Display Panel on which Touch Panel IC 18*a* is Mounted

The following describes control of each drive electrode COML by the drive circuit unit 14 with a configuration in which the touch panel IC 18*a* is mounted. With the configuration, the first mutual detection and the self-detection are performed.

Figure 9:
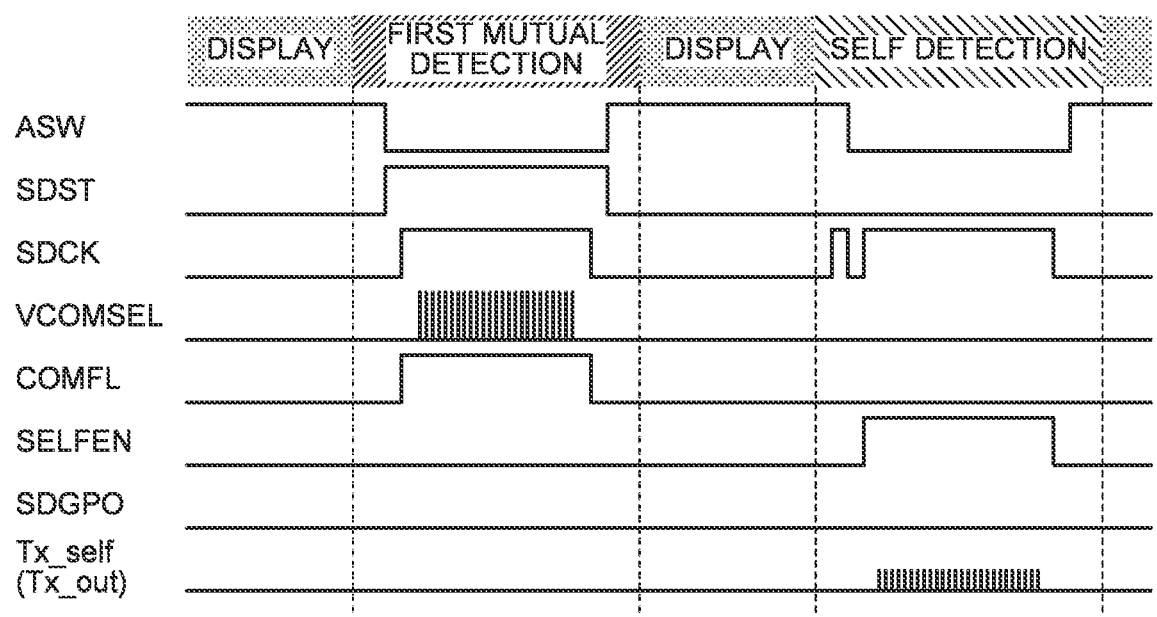
Figure 10:
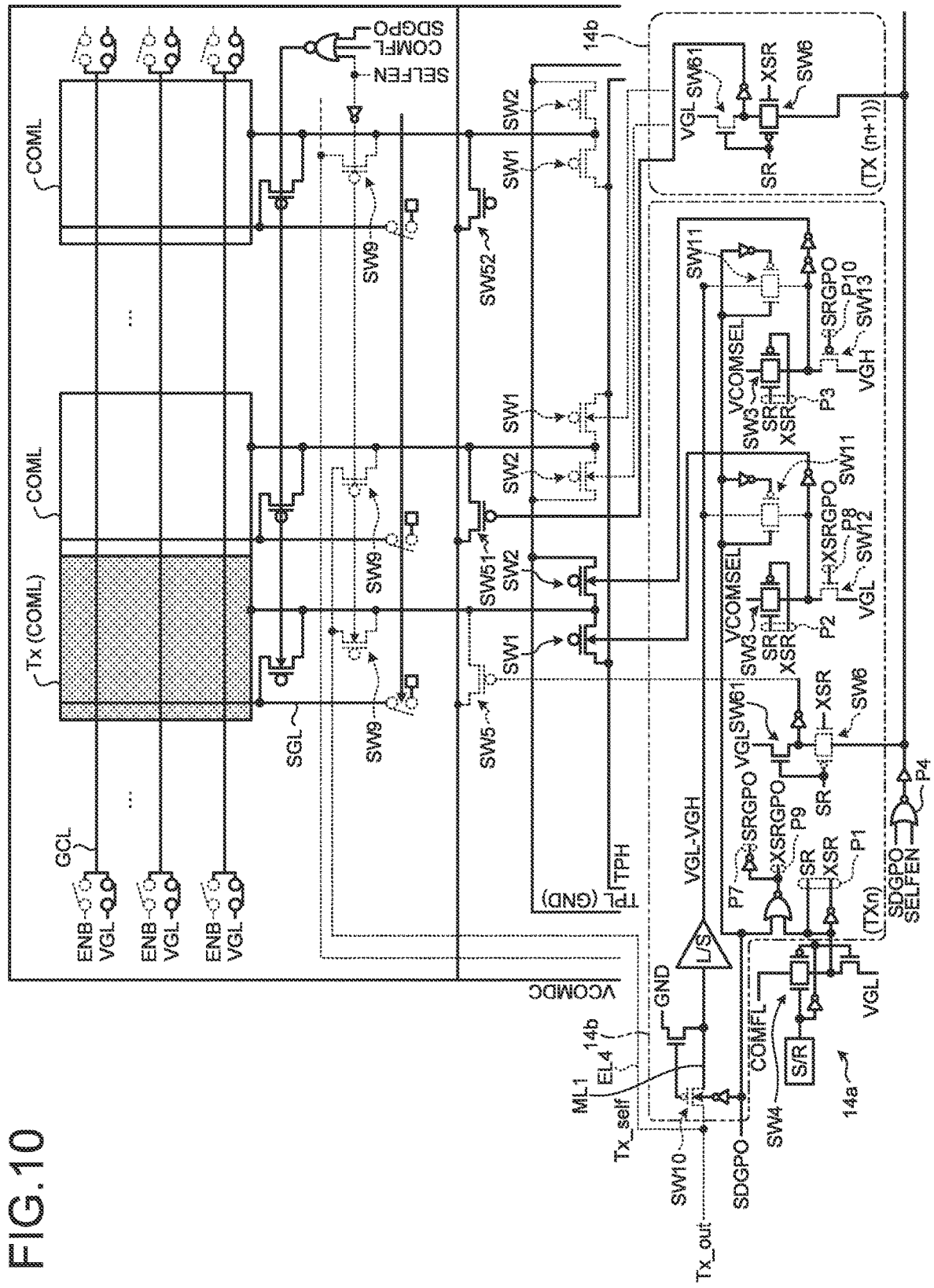
FIG. 10 is a diagram illustrating main circuit configurations of a signal selection circuit and a potential selection circuit and the state of coupling between components in first mutual detection.

FIG. 9 is a schematic time chart illustrating the high-low levels of various signals in a case in which the touch panel IC 18 is the touch panel IC 18*a*. FIG. 10 is a diagram illustrating main circuit configurations of the signal selection circuit 14*b* and the potential selection circuit 14*c* and the state of coupling between components in the first mutual detection.

The touch detection function-equipped display device 1 including the touch panel IC 18*a* operates to alternately repeat a display period, and a first mutual detection period or a self-detection period. In the first mutual detection period, touch detection (the first mutual detection) is performed based on mutual capacitance of the drive electrodes COML and the detection electrodes TDL. In the self-detection period, touch detection (the self-detection) is performed based on self-capacitance. FIG. 9 exemplarily illustrates a pattern in which the first mutual detection period and the self-detection period are alternately performed with one display period interposed therebetween, but the first mutual detection period or the self-detection period may be performed in a larger number of times.

In FIG. 10, the configuration of a drive electrode Tx in the signal selection circuit 14*b* that is a drive target in the first mutual detection is enclosed by a dashed and double-dotted line and denoted by the character string "(TXn)". The configuration of a drive electrode COML in the signal selection circuit 14*b* that is adjacent to the drive electrode Tx and not driven at this timing is denoted by the character string "(TX(n+1))". The configuration denoted by the character string "(TX(n+1))" in the signal selection circuit 14*b* is the same as the configuration denoted by the character string "(TXn)" in the signal selection circuit 14*b*. Although not illustrated, the signal selection circuit 14*b* has the configuration enclosed by a dashed and double-dotted line for each drive electrode COML in the embodiment. The following mainly describes the configuration TXn of the signal selection circuit 14*b*.

The potential selection circuit 14*c* is provided between the drive electrode Tx and the signal selection circuit 14*b*. The potential selection circuit 14*c* includes the first potential line EL1 at the high drive potential TPH, the second potential line EL2 at the low drive potential TPL, and the third potential line EL3 at the non-drive potential VCOMDC. The potential selection circuit 14*c* also includes a switch SW1 between the drive electrode Tx and the first potential line EL1, a switch SW2 between the drive electrode Tx and the second potential line EL2, and a switch SW5 between the drive electrode Tx and the third potential line EL3. The switches SW1, SW2, and SW5 are opened and closed based on an output from the signal selection circuit 14*b*.

In the first mutual detection, the switches SW1 and SW2 of the potential selection circuit 14*c* are alternately opened and closed in accordance with the potential selection signal from the signal selection circuit 14*b*. Thus, the potential of the drive electrode Tx is changed alternately to the high drive potential TPH and the low drive potential TPL to form a plurality of pulsed waves that are to be supplied as a drive signal to the drive electrode Tx. Thus, the first mutual detection can be performed at coordinates corresponding to the position of the drive electrode Tx.

Specifically, when a switch SW3 provided in the signal selection circuit 14b is opened, potential selection signals based on the first signal VCOMSEL are supplied from the signal selection circuit 14b to the switches SW1 and SW2. More specifically, the first signal VCOMSEL is pulsed waves, and while being supplied from the switch SW3 to the switches SW1 and SW2, one of the potential selection signals based on the first signal VCOMSEL becomes in opposite phase to that of the other potential selection signal. Thus, the switches SW1 and SW2 are alternately opened and closed. When the potential selection signal is at one of the high and low levels, one of the switches SW1 and SW2 couples circuits and the other of the switches SW1 and SW2 decouples circuits. When the potential selection signal is at the other of the high and low levels, the other of the switches SW1 and SW2 couples circuits and the one of the switches SW1 and SW2 decouples circuits.

Thus, the high drive potential TPH and the low drive potential TPL are alternately supplied to the drive electrode Tx, whereby the drive signal Vcom is formed. The drive signal Vcom is supplied to the drive electrode Tx, generates capacitance between the drive electrode Tx and each detection electrode TDL, and is output as a detection signal from the detection electrodes TDL to the touch panel IC 18a. In other words, the first signal supplied to the signal selection circuit 14b is supplied to the potential selection circuit 14c through the signal selection circuit 14b and amplified by the potential selection circuit 14c, whereby a drive signal is obtained, and the drive signal is output to the drive electrode Tx.

The switch SW3 is opened in accordance with supply of signals SR and XSR. The signals SR and XSR are generated based on the signal COMFL supplied to the signal selection circuit 14b when a switch SW4 in the scanning circuit 14a is opened in response to the shift register signal S/R. The signal SR is a signal corresponding to the potential of the signal COMFL. The signal XSR is a signal obtained by inverting the potential of the signal COMFL. End parts P1 and P2 in FIG. 10 and other figures are coupled to each other in actuality. The end part P1 and an end part P3 in FIG. 10 and other figures are coupled to each other in actuality.

In this case, the switch SW5 of the potential selection circuit 14c is opened when neither the type signal SDGPO nor the signal SELFEN is supplied to a NOR circuit P4 (both signals are at a low level) and a signal from the NOR circuit P4 is supplied to the gate of the switch SW5. However, a switch SW6 having a phase opposite to that of the switch SW3 is provided between the gate of the switch SW5 and the NOR circuit P4. That is, the switch SW6 is opened when the switch SW3 is closed. Thus, at a timing when the potential of the drive electrode Tx is changed in accordance with the first signal VCOMSEL, the switch SW6 decouples circuits since the signals SR and XSR are supplied and the switch SW3 is opened. When the switch SW6 decouples circuits, a switch SW61 configured to couple circuits in accordance with the signal SR operates, so that the low potential VGL is supplied to the gate of the switch SW5. A signal is inverted once between the switch SW5 and each of the switches SW6 and SW61. Thus, the low potential VGL is inverted, whereby a signal at the high level is provided to the switch SW5. The switch SW5 is a P-ch switch. Thus, the switch SW5 decouples the path of coupling between the drive electrode Tx and the third potential line EL3.

However, in the signal selection circuit 14b (TX(n+1)) corresponding to the drive electrode (TX(n+1)), the signal COMFL from the scanning circuit 14a are not supplied, and the signals SR and XSR for turning on the switch SW3 are not generated. Meanwhile, the switch SW6 couples circuits. Therefore, a switch SW51 of a drive electrode COML that is not driven at the timing of drive of the drive electrode Tx couples the path of coupling between the drive electrode Tx and the third potential line EL3. Thus, the potential of the drive electrode COML that is not driven at the timing of drive of the drive electrode Tx becomes the non-drive potential VCOMDC. When the switch SW6 couples the path of coupling between the drive electrodes COML and the third potential line EL3, the path of coupling through the switch SW61 is decoupled. The switch SW51 is a switch SW5 provided for the drive electrode COML adjacent to the drive electrode Tx in FIG. 10. The electric configuration coupled to the switch SW51 is the same as that coupled to the switch SW5. The electric configuration coupled to a switch SW52 coupled to a signal selection circuit 14b (TX(n+2)) corresponding to a drive electrode (TX(n+2)) is the same as that coupled to the switch SW51.

As described above, whether to generate the signals SR and XSR corresponds to the operation of the shift register of the scanning circuit 14a. In the first mutual detection, the signal selection circuit 14b (TXn) that controls the potential of the selected drive electrode Tx is supplied with the signal COMFL from the scanning circuit 14a and generates the signals SR and XSR in accordance with the shift register signal S/R. However, the signal selection circuit 14b (TX (n+1) or the like) that controls the potential of a drive electrode COML that is not driven at the timing of drive of the drive electrode Tx is not supplied with the signal COMFL from the scanning circuit 14a and does not generate the signals SR and XSR in accordance with the shift register signal S/R. More specifically, in this case, wiring that is supplied with the signals SR and XSR is supplied with a signal based on the low potential VGL, which does not cause circuit drive as described above.

A bypass line ML1 extending from the touch panel IC 18a joins signal lines coupled to the gates of the switches SW1 and SW2. A level shifter L/S is provided between the switches SW1 and SW2 on the bypass line ML1, amplifies the output from the touch panel IC 18a, and outputs the amplified output to each of the switches SW1 and SW2. This output potential is preferably the high potential VGH or the low potential VGL. A switch SW10 is interposed between the touch panel IC 18a and the level shifter L/S. A switch SW11 is interposed between each of the signal lines and the bypass line ML1. The switches SW10 and SW11 operate to couple paths when the type signal SDGPO is at the high level, but in the first mutual detection, the type signal SDGPO is maintained at the low level. Thus, the operation of the switches SW1 and SW2 based on a signal supplied from the touch panel IC 18a through the bypass line ML1 does not occur in the first mutual detection.

The signal line coupled to the gate of the switch SW1 is coupled to a supply source of the low potential VGL that functions as a signal that causes the switch SW1 to decouple circuits. However, a switch SW12 is interposed between the signal line and the supply source. The switch SW12 couples circuits in accordance with a signal XSRGPO generated based on the type signal SDGPO or the signal COMFL. The switch SW1 of the present embodiment is a switch (P-ch switch) that decouples circuits in response to a high potential. The signal as the low potential VGL is inverted once between the switches SW12 and SW1. In the first mutual detection, the switch SW12 decouples circuits in accordance with the signal XSRGPO generated based on the signal COMFL. Terminals P7 and P10 in FIG. 10 and other figures are coupled to each other in actuality. Terminals P9 and P8 in FIG. 10 and other figures are coupled to each other in actuality.

The signal line coupled to the gate of the switch SW2 is coupled to a supply source of the high potential VGH that functions as a signal that causes the switch SW2 to decouple circuits. However, a switch SW13 is interposed between the signal line and the supply source. The switch SW13 couples circuits in accordance with a signal SRGPO generated based on the type signal SDGPO or the signal COMFL. In the first mutual detection, the switch SW13 decouples circuits in accordance with the signal SRGPO generated based on the signal COMFL.

On each bypass line ML1, a branch line branches off from at least a position on the drive electrode COML side of the above-described switch SW10 and extends to the vicinity of an end part of the drive electrode COML. A switch SW9 as a self-switch is provided between an output line of the switches SW1 and SW2 and the drive electrodes COML. On-off control of the switch SW9 is performed by the signal SELFEN output from the DDIC 19. The signal SELFEN is not supplied in the first mutual detection. Thus, the drive electrode Tx is not coupled to a fourth potential line EL4 in the first mutual detection. The signal SELFEN is also supplied to the drive circuit unit 14 (P4) to control the state of coupling between the drive circuit unit 14 and the drive electrode COML.

As described above, the switches SW9 corresponding to all drive electrodes COML are opened in the first mutual detection. In the drive electrode Tx as a drive target, the switch SW5 is opened, the switches SW1 and SW2 are each repeatedly turned on and off by a signal based on the first signal VCOMSEL through the switch SW3, whereby a drive signal formed with the potentials VGH and VGL is supplied to the drive electrode Tx. In a drive electrode COML that is not a drive target, the switch SW5 is closed, whereby the non-drive potential VCOMDC is supplied to the drive electrode COML. The drive electrode Tx as a target is sequentially shifted by the shift register function of the scanning circuit 14a.

The scanning circuit 14a includes the switch SW4.

The signal selection circuit 14b includes the switch SW3, the switch SW6, the switch SW61, the switch SW10, the switch SW11, the switch SW12, the switch SW13, and the level shifter L/S.

The potential selection circuit 14c includes the switch SW1, the switch SW2, and the switch SW5 (or the switch SW51 or SW52).

The self-switch 14d includes the switch SW9.

The gate line GCL is coupled to the low potential VGL at various touch detection timings.

Figure 11:
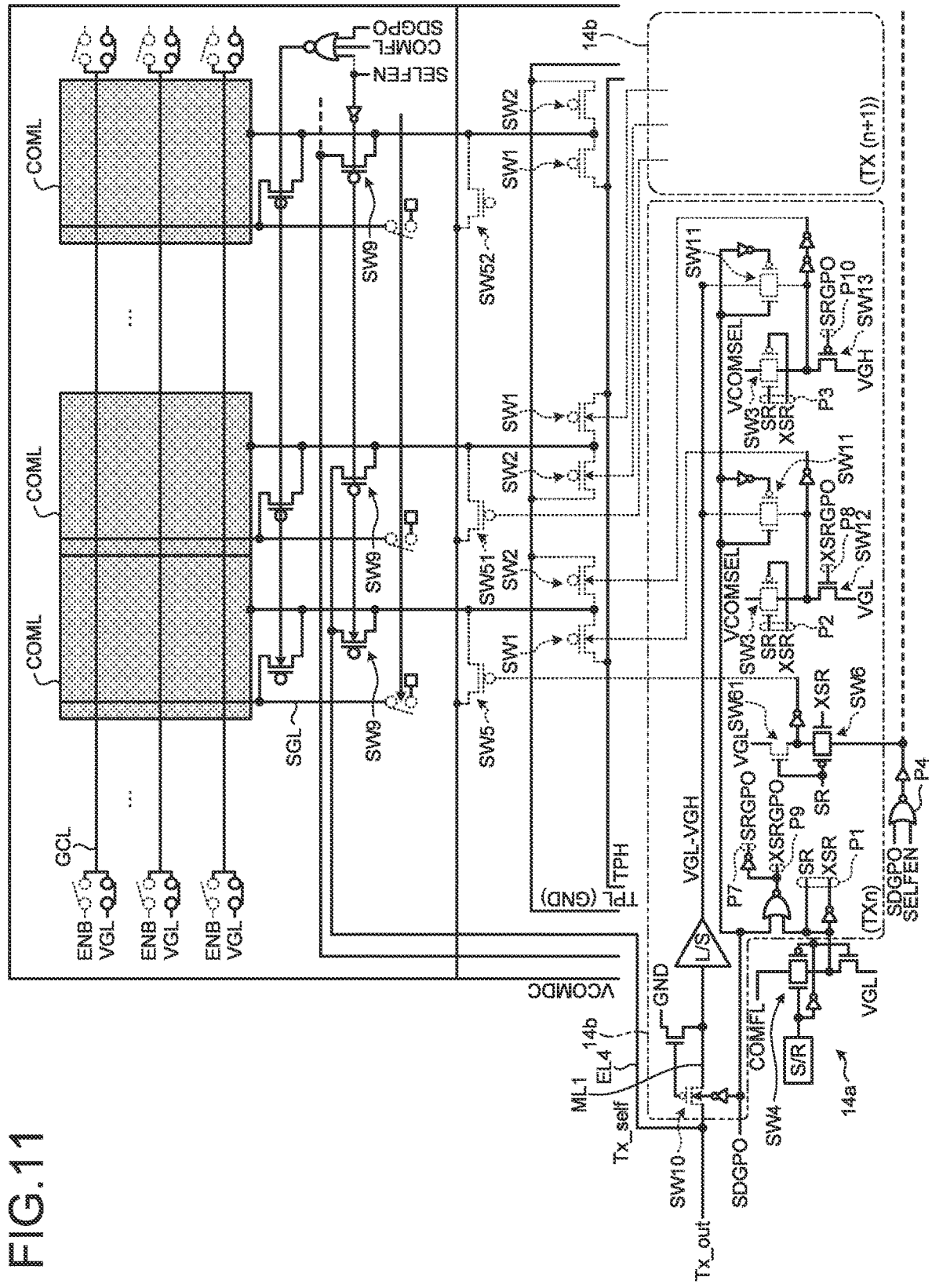
FIG. 11 is a diagram illustrating main circuit configurations of the signal selection circuit and the potential selection circuit and the state of coupling between components in self-detection.

FIG. 11 is a diagram illustrating main circuit configurations of the signal selection circuit 14b and the potential selection circuit 14c and the state of coupling between components in the self-detection. In the self-detection, the scanning circuit 14a does not perform the shift register drive, whereby the signal COMFL is not output from the scanning circuit 14a toward the signal selection circuit 14b. Therefore, the signals SR and XSR are not generated in the signal selection circuit 14b, whereby the switch SW3 decouples circuits. Therefore, the first signal VCOMSEL is not supplied from the signal selection circuit 14b toward the potential selection circuit 14c in the self-detection. As a result, the operations of the switches SW1 and SW2 based on the first signal VCOMSEL do not occur.

In the self-detection, the signals SR and XSR are not generated as described above. Thus, the switch SW6 is closed. However, the signal SELFEN is supplied to the NOR circuit P4 (at the high level) in the self-detection. Thus, the switch SW5 is supplied with a signal from the NOR circuit P4 and decouples the path of coupling between the drive electrode COML and the third potential line EL3. Such drive is due to the NOR circuit P4 coupled to all signal selection circuits 14b, and all signal selection circuits 14b become the above-described state. Consequently, in a manner similar to the switch SW5, the switches SW51 and SW52 are supplied with a signal from the NOR circuit P4 and decouple the path of coupling in the self-detection.

In the self-detection, the switch SW9 is supplied with the signal SELFEN and thereby couples the drive electrode COML and the fourth potential line EL4. Thus, the drive signal Tx_self supplied from the touch panel IC 18a is directly supplied to the drive electrode COML not through the signal selection circuit 14b. In other words, the potential of each drive electrode COML becomes a potential corresponding to the drive signal Tx_self directly supplied from the touch panel IC 18a. In the embodiment, the potential corresponding to the drive signal Tx_self for the self-detection is a potential corresponding to the high-low level of the second signal Tx_out in effect, but a potential dedicated for the self-capacitance potential that functions in the same manner thereas may be output from any other component. The other component may be the DDIC 19 or the power circuit 17.

In the self-detection, the drive electrodes COML are driven by the touch panel IC 18a. Since the type signal SDGPO is not supplied, the switches SW10 and SW11 decouples circuits, in a manner similar to a case of the first mutual detection.

In the self-detection, the switch SW12 couples circuits based on the signal XSRGPO in response to no supply of the type signal SDGPO nor the signal COMFL (at the low level). Thus, the low potential VGL that functions as a signal that causes the switch SW1 to decouple circuits is inverted once and provided to the gate of the switch SW1, whereby the switch SW1 decouples circuits.

In the self-detection, the switch SW13 couples circuits based on the signal SRGPO in response to no supply of the type signal SDGPO nor the signal COMFL (at the low level). Thus, the high potential VGH that functions as a signal that causes the switch SW2 to decouple circuits is provided to the gate of the switch SW2, whereby the switch SW2 decouples circuits.

Display Panel on which Touch Panel IC 18b is Mounted

Figure 12:
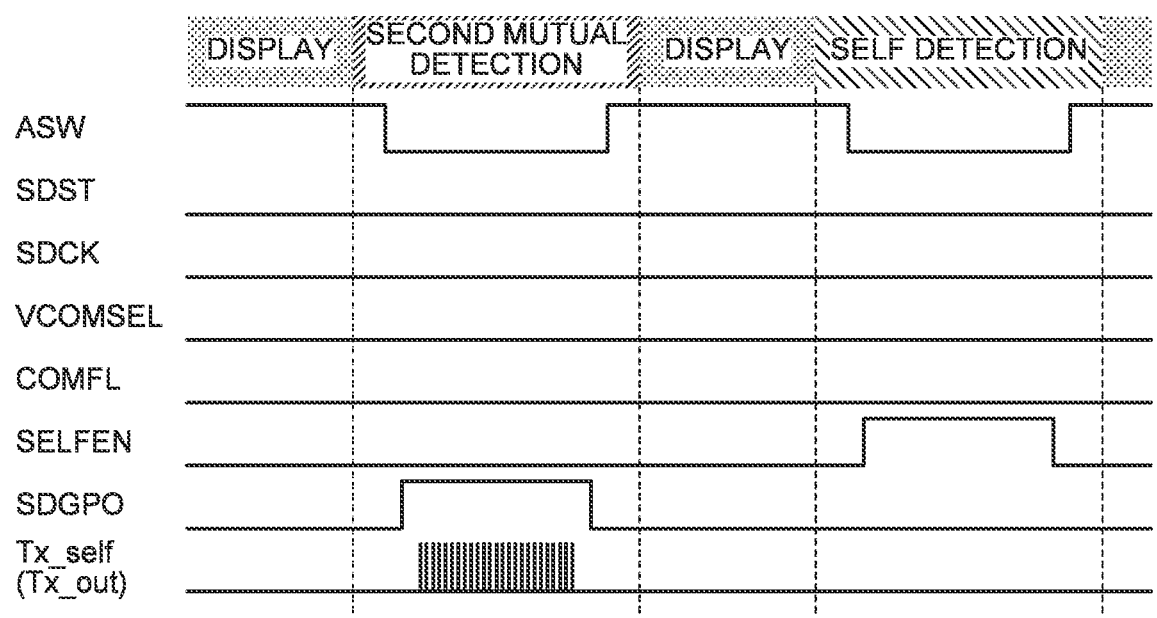
FIG. 12 is a schematic time chart illustrating the high-low levels of various signals in a case in which the touch panel IC 18 is the touch panel IC 18b.
Figure 13:
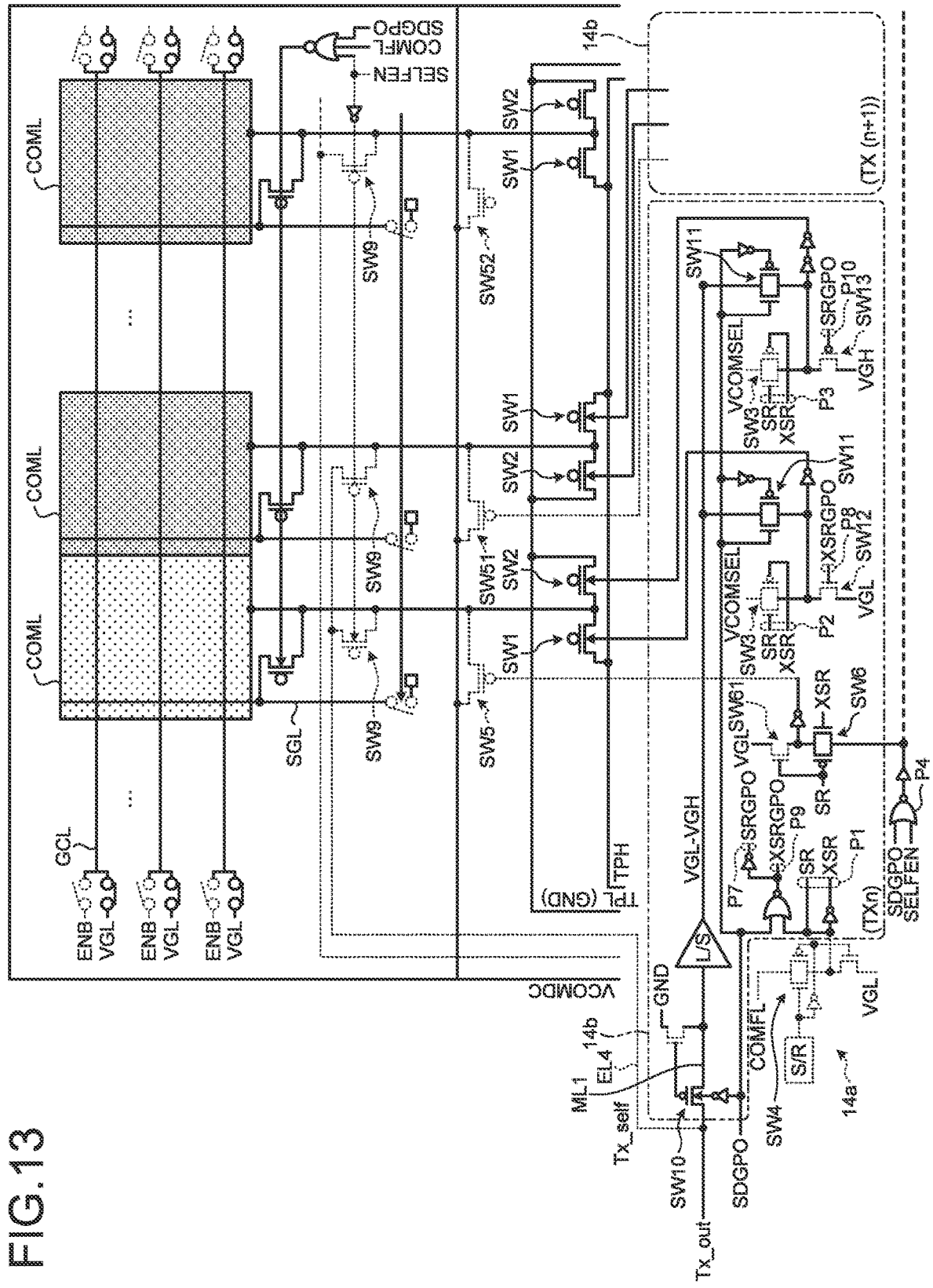
FIG. 13 is a diagram illustrating main circuit configurations of the signal selection circuit and the potential selection circuit and the state of coupling between components in second mutual detection.

The following describes a case in which the touch panel IC 18 is the touch panel IC 18b with reference to FIGS. 12 and 13.

FIG. 12 is a schematic time chart illustrating the high-low levels of various signals in a case in which the touch panel IC 18 is the touch panel IC 18b. FIG. 13 is a diagram illustrating main circuit configurations of the signal selection circuit 14b and the potential selection circuit 14c and the state of coupling between components in the second mutual detection.

The touch detection function-equipped display device 1 including the touch panel IC 18b operates to alternately repeat the display period, and a second mutual detection period or the self-detection period. In the second mutual detection period, touch detection (the second mutual detection) is performed based on mutual capacitance of the drive electrodes COML and the detection electrodes TDL. FIG. 12 exemplarily illustrates a pattern in which the second mutual detection period and the self-detection period are alternately performed with one display period interposed therebetween, but the second mutual detection period or the self-detection period may be performed in a larger number of times. The following describes the second mutual detection with reference to FIG. 13. In a manner similar to the first mutual detection, the second mutual detection is mutual capacitive touch detection. Specific drive of the self-detection is the same as in the case of the touch panel IC 18a in effect, and thus description thereof is omitted.

In the second mutual detection, the scanning circuit 14a is not driven. Thus, the signal COMFL is not supplied to the signal selection circuit 14b. Consequently, the signals SR and XSR are not generated, and the switch SW3 decouples circuits. In the second mutual detection, the first signal VCOMSEL is supplied from the DDIC 19 to the signal selection circuit 14b. Thus, the operations of the switches SW1 and SW2 based on the first signal VCOMSEL do not occur.

In the second mutual detection, the signals SR and XSR are not generated as described above. However, in the second mutual detection, the type signal SDGPO is supplied to the NOR circuit P4 (at the high level). Consequently, the switch SW5 is supplied with a signal from the NOR circuit P4 and decouples the path of coupling between the drive electrode COML and the third potential line EL3. In the second mutual detection, in a similar manner to the switch SW5, the switches SW51 and SW52 are supplied with a signal from the NOR circuit P4 and decouple the path of coupling.

In the second mutual detection, the signal SELFEN is not supplied. Thus, the switch SW9 decouples the path of coupling between the drive electrodes COML and the fourth potential line EL4 in the second mutual detection.

In the second mutual detection, the type signal SDGPO is supplied. Thus, the path of coupling through the switches SW10 and SW11 is coupled. However, the path of coupling through the switches SW12 and SW13 is decoupled. Consequently, the switches SW1 and SW2 operate in accordance with switching of the high-low level based on the high potential VGH and the low potential VGL generated by the level shifter L/S. When supplied with one of the high potential VGH and the low potential VGL, one of the switches SW1 and SW2 couples circuits and the other switch decouples circuits. When supplied with the other of the high potential VGH and the low potential VGL, the other switch couples circuits and the one switch decouples circuits.

In the second mutual detection, the high potential VGH and the low potential VGL supplied to the gate of the switch SW1 or SW2 are signals obtained by amplifying the high-low level of the second signal Tx_out by the level shifter L/S, and the high potential (VGH) and the low potential (VGL) are switched in accordance with the high-low level of the second signal Tx_out.

Such control may be employed that, when a switching pattern of the potential of one of drive electrodes COML adjacent to each other is defined as a normal phase, a switching pattern of the potential of the other electrode is controlled to be a phase (opposite phase) opposite to the normal phase. Specifically, when the switch SW1 is a switch interposed between one of the adjacent drive electrodes COML and the first potential line EL1 at the high drive potential TPH, the switch SW2 is a switch interposed between the other of the adjacent drive electrodes COML and the first potential line EL1 at the high drive potential TPH. When the switch SW2 is a switch interposed between one of the adjacent drive electrodes COML and the second potential line EL2 at the low drive potential TPL, the switch SW1 is a switch interposed between the other of the adjacent drive electrodes COML and the second potential line EL2 at the low drive potential TPL. Thus, potential lines (the first potential line EL1 and the second potential line EL2) that are coupled in accordance with the high level and the low level of the high potential VGH and the low potential VGL are interchanged between one and the other of the adjacent drive electrodes COML, whereby the control can be performed.

As described above, the switches SW9 corresponding to all the drive electrodes COML are opened in the second mutual detection. In at least the drive electrode Tx as a drive target, the switch SW5 is opened, the switches SW1 and SW2 are each repeatedly turned on and off by a signal based on the second signal Tx_out through the switch SW10 and 11, whereby a drive signal formed of the potentials VGH and VGL is supplied to the drive electrode Tx. The drive electrode Tx as the drive target is sequentially shifted as the second signal Tx_out output from the touch panel IC 18b is sequentially shifted. The touch panel IC 18b outputs the second signal to the bypass line ML1 coupled to the drive electrode Tx as the drive target. This output is not enough to drive the drive electrode Tx. Therefore, the output is amplified by the level shifter and then supplied to each switch. In addition, the touch panel IC 18b supplies an off-control signal to wiring coupled to a drive electrode COML that is not the drive target. This signal becomes the low potential VGL through the level shifter and is supplied to the switch SW11. Thus, the switch SW1 is subjected to off-control and the switch SW2 is subjected to on-control, whereby the low drive potential TPL is supplied to each corresponding drive electrode COML.

Figure 14:
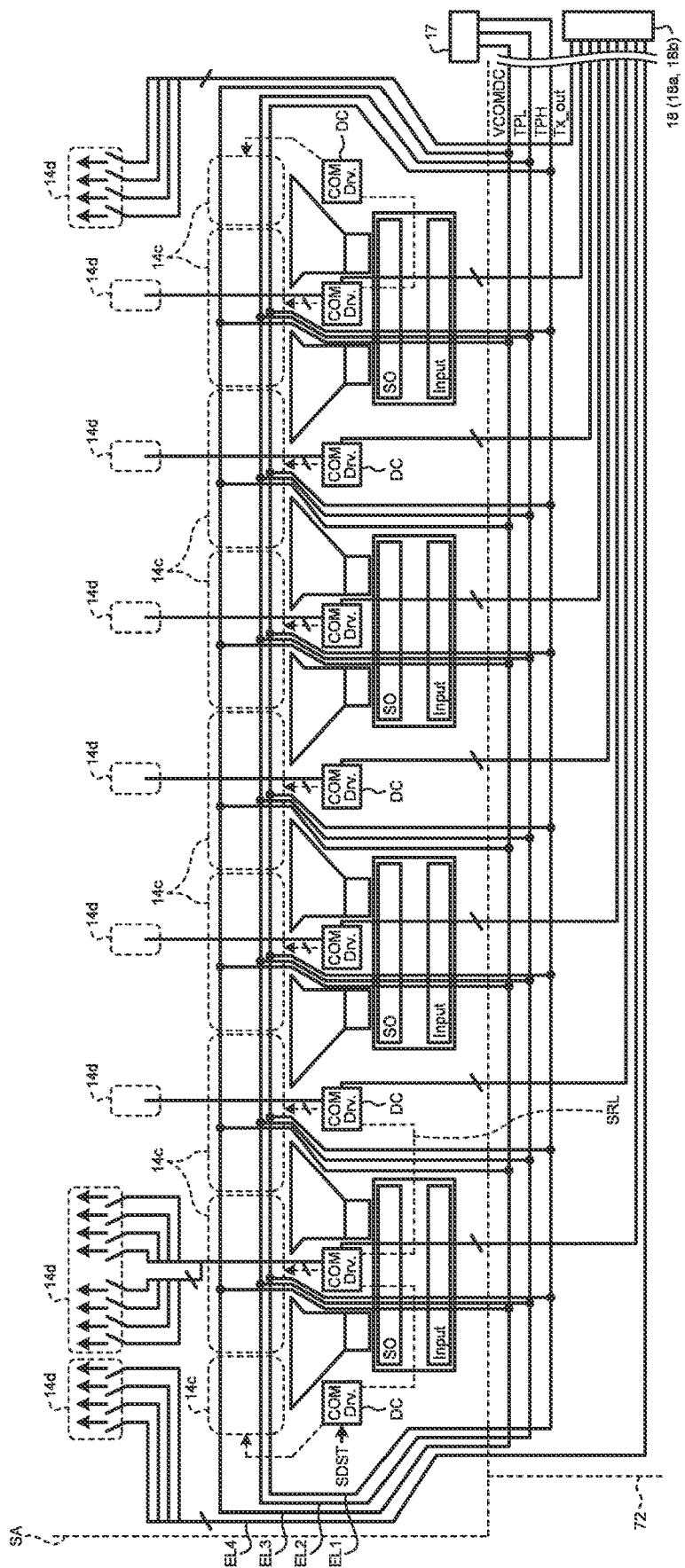
FIG. 14 is a diagram illustrating an exemplary specific circuit configuration in a space.

FIG. 14 is a diagram illustrating an exemplary specific circuit configuration in the extension part SA. "SO" in FIG. 14 stands for source output. In the extension part SA, a plurality of IC chips, such as the DDIC 19, for supplying the pixel signals Vpix to the source lines SGL are provided in the X direction. In addition, COM drivers DC are provided between the IC chips. The COM drivers DC function as the scanning circuits 14a and the signal selection circuits 14b corresponding to a predetermined number (for example, four or eight) of drive electrodes COML. In addition, the potential selection circuit 14c and the self-switch 14d are provided between each COM driver and the corresponding drive electrode (not illustrated). A dashed line SRL coupling COM drivers DC adjacent to each other is a transmission path of the shift register signal S/R. With this configuration, the COM drivers are sequentially driven in synchronization with one another.

In an example illustrated in FIG. 14, the first potential line EL1, the second potential line EL2, the third potential line EL3, and the fourth potential line EL4 extend from the flexible substrate 72 to the extension part SA. In the illustrated example, the power circuit 17 is provided on the flexible substrate 72 side of the extension part SA, but the present disclosure is not limited thereto, and specific wiring forms of the power circuit 17, the first potential line EL1, the second potential line EL2, the third potential line EL3, and the fourth potential line EL4 are changeable as appropriate.

As illustrated in FIG. 14, the COM drivers DC (the scanning circuits 14a and the signal selection circuits 14b) and the potential selection circuits 14c can be mounted with minimum influence on designing of various components with which the touch detection function-equipped display device 1 displays an image.

According to the embodiment, the touch detection function-equipped display device 1 includes: the display panel 20 in which the pixels Pix are disposed; the drive electrodes COML disposed along a display surface of the display panel 20 and arranged in the X direction; the detection electrodes TDL disposed along the display surface, arranged in the Y direction, and facing the drive electrodes COML; the potential selection circuit 14c configured to perform switching control to switch a potential to be applied to each drive electrode COML between the drive signal Vcom and the non-drive potential VCOMDC; the scanning circuit 14a configured to output the shift register signal S/R indicating a drive electrode COML to be used for touch detection among the drive electrodes COML; the touch panel IC 18 configured to detect touch operation based on potentials of the detection electrodes TDL; and the signal selection circuit 14b configured to supply either the first signal VCOMSEL corresponding to the shift register signal S/R or the second signal Tx_out to the potential selection circuit 14c. When the first signal VCOMSEL is supplied from the scanning circuit 14a, the switching control applies the drive signal Vcom to some (for example, the drive electrode Tx) of the drive electrodes COML and applies the non-drive potential VCOMDC to the other drive electrodes COML. The signal selection circuit 14b can receive the second signal Tx_out from the touch panel IC 18, whereby the signal selection circuit 14b and the potential selection circuit 14c can be controlled based on the second signal from the touch panel IC 18 to supply the drive signal to each drive electrode COML. Thus, touch detection can be performed by the switching control whether the touch panel IC 18 is the touch panel IC 18a or the touch panel IC 18b. Consequently, it is possible to use a larger number of kinds of the touch panel IC 18.

The touch detection function-equipped display device 1 further includes the DDIC 19 configured to control the operation of the signal selection circuit 14b. The DDIC 19 outputs the type signal SDGPO corresponding to the kind of the touch panel IC 18 (the touch panel IC 18a or the touch panel IC 18b) to the signal selection circuit 14b. The signal selection circuit 14b supplies either the first signal VCOMSEL or the second signal Tx_out to the potential selection circuit 14c in accordance with the type signal SDGPO. Thus, it is possible, only by changing the high-low level of the type signal SDGPO, to employ both the touch panel IC 18a and the touch panel IC 18b.

In the above-described embodiment, the second signal Tx_out is not supplied to the DDIC 19 but another identification signal is supplied from the touch panel IC 18 toward the DDIC 19, but the present disclosure is not limited thereto. In another embodiment, an output from the DDIC 19 may be changed in advance to be adjusted to the touch panel IC 18 employed.

The preferable embodiments of the present disclosure are described above, but the present disclosure is not limited to such embodiments. Contents disclosed in the embodiments are merely exemplary and may be modified in various kinds of manners without departing the scope of the present disclosure. Any modification performed as appropriate without departing the scope of the present disclosure belongs to the technical scope of the present disclosure.

Although each detection electrode TDL includes a metal line, the detection electrode TDL may be made of a translucent conductive material such as ITO. In this case as well, it is possible to obtain invisible appearance of the frame region 10b while reducing increase of the width of the frame region 10b, by designing the frame line as a metal line.

Detection of the operation by a user, which is described above as "touch detection", is not limited to a touch operation on the display surface of the touch detection function-equipped display device 1, but includes detection of any operation, such as a hover operation or a press operation, which can be performed by a user on the touch detection function-equipped display device 1.

What is claimed is:

1. A detection function-equipped display device comprising:
   a display unit in which a plurality of pixels are disposed;
   a plurality of drive electrodes disposed along a display surface of the display unit and arranged in a first direction;
   a plurality of detection electrodes disposed along the display surface, arranged in a second direction different from the first direction, and facing the drive electrodes;
   a potential selection circuit configured to perform switching control to switch a potential to be applied to each drive electrode between a drive potential and a non-drive potential;
   a scanning circuit configured to output a scanning signal for scanning the drive electrodes;
   a detection circuit configured to perform detection of a touch on the display surface based on potentials output from the detection electrodes; and
   a signal selection circuit configured to supply, to the potential selection circuit, either a first signal corresponding to the scanning signal from the scanning circuit or a second signal from the detection circuit, wherein
   the switching control includes:
      first processing of applying the drive potential, but not applying the non-drive potential, to one or more of the drive electrodes based on one of the first signal and the second signal; and
      second processing of applying the non-drive potential to the other drive electrodes other than the one or more of the drive electrodes, the first processing and the second processing being performed during a detection period.

2. The detection function-equipped display device according to claim 1, wherein the signal selection circuit is coupled to the scanning circuit and the detection circuit and configured to perform the switching control.

3. The detection function-equipped display device according to claim 1, wherein
   the potential selection circuit includes
      a potential line corresponding to the drive potential,
      a potential line corresponding to the non-drive potential, and
      switches provided between the drive electrode and the respective potential lines, and
   each of the switches is controlled by an output from the signal selection circuit.

4. The detection function-equipped display device according to claim 1, wherein the detection circuit and the signal selection circuit are directly coupled to each other through a bypass line but not through the scanning circuit.

5. The detection function-equipped display device according to claim 4, wherein the bypass line is provided with a level shifter configured to amplify the second signal from the detection circuit.

6. The detection function-equipped display device according to claim 4, wherein each drive electrode and the detection circuit are coupled to each other through a branch line but not through the signal selection circuit nor the potential selection circuit.

7. The detection function-equipped display device according to claim 6, wherein the branch line has one end coupled to the bypass line and another end coupled to a switch configured to control a state of coupling between the detection circuit and the drive electrode.

8. The detection function-equipped display device according to claim 1, wherein each drive electrode and the detection circuit are coupled to each other through a branch line but not through the signal selection circuit nor the potential selection circuit.

9. A detection function-equipped display device comprising:
 a display unit in which a plurality of drive electrodes, a plurality of pixels each including a pixel electrode facing a corresponding one of the drive electrodes, and a plurality of detection electrodes facing the drive electrodes are disposed;
 a DDIC configured to drive the drive electrodes and the pixel electrodes;
 a touch IC coupled to the detection electrodes and configured to perform detection of a touch based on outputs from the detection electrodes;
 a potential selection circuit coupled to each of the drive electrodes and configured to perform switching control to switch a potential of each of the drive electrodes between a drive potential and a non-drive potential; and
 a signal selection circuit coupled to the DDIC and the touch IC and configured to supply, to the potential selection circuit, either a first signal from the DDIC or a second signal from the touch IC, wherein
 the switching control includes:
  first processing of applying the drive potential, but not applying the non-drive potential, to one or more of the drive electrodes based on one of the first signal and the second signal; and
  second processing of applying the non-drive potential to the other drive electrodes other than the one or more of the drive electrodes, the first processing and the second processing being performed during a detection period.

10. The detection function-equipped display device according to claim 9, wherein
 the potential selection circuit includes
  a potential line corresponding to the drive potential,
  a potential line corresponding to the non-drive potential, and
  switches provided between the drive electrode and the respective potential lines, and
 each of the switches is controlled by an output from the signal selection circuit.

11. The detection function-equipped display device according to claim 9, wherein the touch IC and the signal selection circuit are directly coupled to each other through a bypass line but not through the scanning circuit.

12. The detection function-equipped display device according to claim 11, wherein the bypass line is provided with a level shifter configured to amplify the second signal from the touch IC.

13. The detection function-equipped display device according to claim 11, wherein each drive electrode and the touch IC are coupled to each other through a branch line but not through the signal selection circuit nor the potential selection circuit.

14. The detection function-equipped display device according to claim 13, wherein the branch line has one end coupled to the bypass line and another end coupled to a switch configured to control a state of coupling between the touch IC and the drive electrode.

15. The detection function-equipped display device according to claim 9, wherein each drive electrode and the touch IC are coupled to each other through a branch line but not through the signal selection circuit nor the potential selection circuit.

16. A detection function-equipped display device comprising:
 a display unit in which a plurality of pixels are disposed;
 a plurality of drive electrodes disposed along a display surface of the display unit and arranged in a first direction;
 a plurality of detection electrodes disposed along the display surface, arranged in a second direction different from the first direction, and facing the drive electrodes;
 a potential selection circuit configured to perform switching control to switch a potential to be applied to each drive electrode between a drive potential and a non-drive potential;
 a scanning circuit configured to output a scanning signal for scanning the drive electrodes;
 a detection circuit configured to perform detection of a touch on the display surface based on potentials output from the detection electrodes; and
 a signal selection circuit configured to supply, to the potential selection circuit, either a first signal corresponding to the scanning signal from the scanning circuit or a second signal from the detection circuit,
 wherein
 the switching control includes processing of applying the drive potential to one or more of the drive electrodes based on one of the first signal and the second signal and applying the non-drive potential to the other drive electrodes other than the one or more of the drive electrodes,
 the detection circuit and the signal selection circuit are directly coupled to each other through a bypass line but not through the scanning circuit,
 each drive electrode and the detection circuit are coupled to each other through a branch line but not through the signal selection circuit nor the potential selection circuit, and
 the branch line has one end coupled to the bypass line and another end coupled to a switch configured to control a state of coupling between the detection circuit and the drive electrode.

17. The detection function-equipped display device according to claim 16, wherein the signal selection circuit is coupled to the scanning circuit and the detection circuit and configured to perform the switching control.

18. The detection function-equipped display device according to claim 16, wherein
 the potential selection circuit includes
  a potential line corresponding to the drive potential,
  a potential line corresponding to the non-drive potential, and
  switches provided between the drive electrode and the respective potential lines, and
 each of the switches is controlled by an output from the signal selection circuit.

19. The detection function-equipped display device according to claim 16, wherein the bypass line is provided with a level shifter configured to amplify the second signal from the detection circuit.

20. A detection function-equipped display device comprising:
- a display unit in which a plurality of drive electrodes, a plurality of pixels each including a pixel electrode facing a corresponding one of the drive electrodes, and a plurality of detection electrodes facing the drive electrodes are disposed;
- a DDIC configured to drive the drive electrodes and the pixel electrodes;
- a touch IC coupled to the detection electrodes and configured to perform detection of a touch based on outputs from the detection electrodes;
- a potential selection circuit coupled to each of the drive electrodes and configured to perform switching control to switch a potential of each of the drive electrodes between a drive potential and a non-drive potential; and
- a signal selection circuit coupled to the DDIC and the touch IC and configured to supply, to the potential selection circuit, either a first signal from the DDIC or a second signal from the touch IC, wherein the switching control includes processing of applying the drive potential to one or more of the drive electrodes based on one of the first signal and the second signal and applying the non-drive potential to the other drive electrodes other than the one or more of the drive electrodes, the touch IC and the signal selection circuit are directly coupled to each other through a bypass line but not through the scanning circuit, each drive electrode and the touch IC are coupled to each other through a branch line but not through the signal selection circuit nor the potential selection circuit, and the branch line has one end coupled to the bypass line and another end coupled to a switch configured to control a state of coupling between the touch IC and the drive electrode.

* * * * *